United States Patent
Bai et al.

(10) Patent No.: US 10,863,520 B2
(45) Date of Patent: Dec. 8, 2020

(54) REFERENCE SIGNAL TONE LOCATION SHIFT

(71) Applicant: QUALCOMM Incorporated, San Diego, CA (US)

(72) Inventors: Tianyang Bai, Bridgewater, NJ (US); Juergen Cezanne, Ocean Township, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 65 days.

(21) Appl. No.: 16/372,005

(22) Filed: Apr. 1, 2019

(65) Prior Publication Data
US 2019/0349947 A1    Nov. 14, 2019

Related U.S. Application Data

(60) Provisional application No. 62/670,676, filed on May 11, 2018.

(51) Int. Cl.
*H04W 72/08* (2009.01)
*H04L 5/00* (2006.01)

(52) U.S. Cl.
CPC ......... *H04W 72/082* (2013.01); *H04L 5/0007* (2013.01); *H04L 5/0051* (2013.01)

(58) Field of Classification Search
CPC .. H04W 72/08; H04W 72/082; H04L 5/0051; H04L 5/0094; H04L 5/0007; H04L 5/0062; H04L 5/006
See application file for complete search history.

(56) References Cited

U.S. PATENT DOCUMENTS

| | | | |
|---|---|---|---|
| 10,727,998 B2* | 7/2020 | Zhang | H04L 27/2602 |
| 2018/0091350 A1 | 3/2018 | Akkarakaran et al. | |
| 2019/0068308 A1* | 2/2019 | Shin | H04L 27/26 |

OTHER PUBLICATIONS

International Search Report and Written Opinion—PCT/US2019/025388—ISA/EPO—dated Jul. 10, 2019 (183379WO).
QUALCOMM Incorporated: "PTRS Considerations", 3GPP TSG-RAN WG1 90bis, R1-1718548, 3GPP Draft; PTRS_Considerations, 3rd Generation Partnership Project (3GPP), Mobile Competence Centre; 650, Route Des Lucioles; F-06921 Sophia-Antipolis Cedex; France, vol. RAN WG1, No. Prague, CZ, Oct. 9, 2017-Oct. 13, 2017, Oct. 8, 2017 (Oct. 8, 2017), pp. 1-7, XP051340134, Retrieved from the Internet: URL: http://www.3gpp.org/ftp/Meetings_3GPP_SYNC/RAN1/Docs/ [retrieved on Oct. 8, 2017] Section 4.

* cited by examiner

*Primary Examiner* — Kyaw Z Soe
(74) *Attorney, Agent, or Firm* — Holland & Hart LLP

(57) ABSTRACT

Methods, systems, and devices for wireless communications are described. A user equipment (UE) may identify a tone satisfying an impairment value. The UE may select configuration information for communicating with a base station based on the tone. The UE may selectively transmit a signal to the base station indicating the configuration information. The UE may receive a configuration signal from the base station indicating a reference signal tone pattern for communicating reference signals between the UE and the base station.

30 Claims, 16 Drawing Sheets

| DMRS Antenna Port | DMRS Configuration Type 1 | | | | DMRS Configuration Type 2 | | | |
|---|---|---|---|---|---|---|---|---|
| | DL-PTRS-RE-Offset | | | | DL-PTRS-RE-Offset | | | |
| | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | - | - | - | - | 4 | 5 | 10 | 11 |
| 1005 | - | - | - | - | 5 | 10 | 11 | 4 |

FIG. 3

REFERENCE SIGNAL TONE LOCATION SHIFT

CROSS REFERENCES

The present Application for Patent claims the benefit of U.S. Provisional Patent Application No. 62/670,676 by Bai et al., entitled "REFERENCE SIGNAL TONE LOCATION SHIFT," filed May 11, 2018, assigned to the assignee hereof, and expressly incorporated by reference in its entirety herein.

BACKGROUND

The following relates generally to wireless communications, and more specifically to reference signal tone location shift.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems are typically configured to communicate various reference signals (e.g., tones) between wireless devices. Generally, the reference signals are used to provide channel performance measurement and feedback reporting between the wireless devices. In some examples, certain types of reference signals may be associated with higher background noise, increased errors, a poor signal-to-noise ratio (SNR), and the like. One example of such an interfering reference signal includes a direct current (DC) tone. Other types of reference signals may be more heavily impacted by interference. For example, a phase tracking reference signal (PTRS) may be particularly susceptible to background noise, or other interference, such as from a DC tone. Typically, wireless devices that are communicating such reference signals between each other schedule the reference signals on resources to avoid such interference. Therefore, the wireless devices know the location of each reference signal being communicated. However, in some instances, one of the wireless devices may be receiving reference signals from neighboring wireless device(s), which may not be known to the other wireless device. The reference signals (or tones) may be beneficial or may be interfering. Conventional techniques do not provide a mechanism for a neighboring wireless device to communicate an indication of the reference signal (or tone) to the other wireless device that the neighboring wireless device is communicating with.

SUMMARY

The described techniques relate to improved methods, systems, devices, and apparatuses that support reference signal tone location shift. Generally, the described techniques provide for an efficient mechanism for a base station to be able to identify a tone of a user equipment (UE). In some aspects, the tone may be associated with an impairment value, such as a tone having a certain interference level threshold, having a given divide error rate, having a defined signal-to-noise ratio (SNR) (e.g., having a high SNR or a low SNR that satisfies a threshold), and the like. Broadly, the base station may identify the tone based on preconfigured information and/or based on UE signaling. In some aspects, the base station may select, based on the tone, a reference signal tone pattern to use for communicating reference signals between the UE and the base station. In some examples, the reference signal tone pattern may be selected from a set of available reference signal tone patterns. The base station may transmit a configuration signal to the UE that carries or otherwise provides an indication of the reference signal tone pattern.

In some aspects, the UE may assist the base station in determining or otherwise identifying the tone using various signaling techniques. For example, the UE may identify the tone and select configuration information for communicating with the base station based on the tone. In some aspects, the tone may have an associated impairment value that satisfies a threshold (e.g., an associated SNR, background noise level, interference level, performance level, and the like). In some aspects, the UE may selectively transmit a signal to the base station that carries or otherwise conveys an indication of the configuration information. For example, the UE may transmit a signal to the base station that identifies a tone or a reference signal tone pattern that the UE prefers the base station to select (or not select) or may transmit an offset configuration that identifies an offset (e.g., in terms of resource element and/or resource blocks (RBs)) for the reference signal tone pattern configuration with respect to a base line reference signal tone pattern. In one example, the UE may transmit a signal to the base station that carries or otherwise provides an indication identifying one or more reference signal tone patterns and, for each identified reference signal tone pattern, an indication of whether the base station can select or cannot select the corresponding reference signal tone pattern. Accordingly, the UE may receive the configuration signal from the base station that carries or otherwise provides an indication of the reference signal tone pattern selected by the base station. The UE and the base station may perform wireless communications in accordance with the reference signal tone pattern (e.g., the UE and the base station may communicate information and decode the data based on the reference signals communicated in accordance with the reference signal tone pattern). In one example, the reference signals may refer to a phase tracking reference signal (PTRS) and the tone may refer to a receive direct current (DC) tone of the UE.

A method of wireless communication at a UE is described. The method may include identifying a tone satisfying an impairment value, selecting configuration information for communicating with a base station based on the tone, selectively transmitting a signal to the base station indicating the configuration information, and receiving a configuration signal from the base station indicating a reference signal tone pattern for communicating reference signals between the UE and the base station.

An apparatus for wireless communication at a UE is described. The apparatus may include a processor, memory in electronic communication with the processor, and instructions stored in the memory. The instructions may be executable by the processor to cause the apparatus to identify a tone satisfying an impairment value, select configuration information for communicating with a base station based on the tone, selectively transmit a signal to the base station indicating the configuration information, and receive a configuration signal from the base station indicating a reference signal tone pattern for communicating reference signals between the UE and the base station.

Another apparatus for wireless communication at a UE is described. The apparatus may include means for identifying a tone satisfying an impairment value, selecting configuration information for communicating with a base station based on the tone, selectively transmitting a signal to the base station indicating the configuration information, and receiving a configuration signal from the base station indicating a reference signal tone pattern for communicating reference signals between the UE and the base station.

A non-transitory computer-readable medium storing code for wireless communication at a UE is described. The code may include instructions executable by a processor to identify a tone satisfying an impairment value, select configuration information for communicating with a base station based on the tone, selectively transmit a signal to the base station indicating the configuration information, and receive a configuration signal from the base station indicating a reference signal tone pattern for communicating reference signals between the UE and the base station.

In some examples of the method, apparatuses, and non-transitory computer-readable medium described herein, selectively transmitting the signal indicating the configuration information may include operations, features, means, or instructions for transmitting a signal identifying the tone.

In some examples of the method, apparatuses, and non-transitory computer-readable medium described herein, selectively transmitting the signal indicating the configuration information may include operations, features, means, or instructions for transmitting a signal identifying the reference signal tone pattern.

In some examples of the method, apparatuses, and non-transitory computer-readable medium described herein, selectively transmitting the signal indicating the configuration information may include operations, features, means, or instructions for transmitting a signal identifying an offset configuration for a baseline reference signal tone pattern, where the reference signal tone pattern may be based on the offset configuration.

In some examples of the method, apparatuses, and non-transitory computer-readable medium described herein, the offset configuration includes a bit or field configured to indicate a request for an offset from the baseline reference signal tone pattern.

In some examples of the method, apparatuses, and non-transitory computer-readable medium described herein, the offset configuration includes a bit or field configured to indicate a request for the base station to select the reference signal tone pattern.

In some examples of the method, apparatuses, and non-transitory computer-readable medium described herein, the offset configuration includes information identifying a difference between a baseline reference signal tone pattern and the tone.

In some examples of the method, apparatuses, and non-transitory computer-readable medium described herein, the difference includes a time-frequency difference.

In some examples of the method, apparatuses, and non-transitory computer-readable medium described herein, the difference includes an indication to delete one or more tones from the baseline reference signal tone pattern.

Some examples of the method, apparatuses, and non-transitory computer-readable medium described herein may further include operations, features, means, or instructions for identifying the baseline reference signal tone pattern based on one or more of a previously used reference signal tone pattern, or a grant signal carried in a downlink control information (DCI) message, or a configured baseline reference signal tone pattern.

In some examples of the method, apparatuses, and non-transitory computer-readable medium described herein, selecting the configuration information may include operations, features, means, or instructions for selecting, based on the tone, the reference signal tone pattern from a set of available reference signal tone patterns, where the signal identifies the selected reference signal tone pattern.

In some examples of the method, apparatuses, and non-transitory computer-readable medium described herein, the signal includes an indication of whether the base station may be to select the reference signal tone pattern.

In some examples of the method, apparatuses, and non-transitory computer-readable medium described herein, selecting the configuration information may include operations, features, means, or instructions for identifying a UE tone for communications between the UE and the base station, where the UE tone corresponds to the tone.

In some examples of the method, apparatuses, and non-transitory computer-readable medium described herein, selectively transmitting the signal to the base station may include operations, features, means, or instructions for determining that the tone satisfies an interference level threshold with respect to communications between the UE and the base station, where the signal may be transmitted to the base station based on the determining.

In some examples of the method, apparatuses, and non-transitory computer-readable medium described herein, selectively transmitting the signal to the base station may include operations, features, means, or instructions for determining that the tone fails to satisfy an interference level threshold with respect to communications between the UE and the base station, where the signal may be not transmitted to the base station based on the determining.

Some examples of the method, apparatuses, and non-transitory computer-readable medium described herein may further include operations, features, means, or instructions for communicating the reference signals with the base station according to the reference signal tone pattern.

Some examples of the method, apparatuses, and non-transitory computer-readable medium described herein may further include operations, features, means, or instructions for communicating data between the UE and the base station, where the data may be decoded based on the reference signals.

In some examples of the method, apparatuses, and non-transitory computer-readable medium described herein, the communicating includes uplink communications, downlink communications, or a combination thereof.

In some examples of the method, apparatuses, and non-transitory computer-readable medium described herein, the configuration signal may be received in a DCI message.

In some examples of the method, apparatuses, and non-transitory computer-readable medium described herein, the tone includes one or more of a receive DC tone of the UE, or a tone satisfying an SNR threshold, or a tone satisfying an interference level threshold, or a combination thereof.

A method of wireless communication at a base station is described. The method may include identifying a tone of a UE, the tone satisfying an impairment value, selecting, based on the tone, a reference signal tone pattern for communicating reference signals between the UE and the base station, and transmitting a configuration signal to the UE indicating the reference signal tone pattern.

An apparatus for wireless communication at a base station is described. The apparatus may include a processor, memory in electronic communication with the processor, and instructions stored in the memory. The instructions may be executable by the processor to cause the apparatus to identify a tone of a UE, the tone satisfying an impairment value, select, based on the tone, a reference signal tone pattern for communicating reference signals between the UE and the base station, and transmit a configuration signal to the UE indicating the reference signal tone pattern.

Another apparatus for wireless communication at a base station is described. The apparatus may include means for identifying a tone of a UE, the tone satisfying an impairment value, selecting, based on the tone, a reference signal tone pattern for communicating reference signals between the UE and the base station, and transmitting a configuration signal to the UE indicating the reference signal tone pattern.

A non-transitory computer-readable medium storing code for wireless communication at a base station is described. The code may include instructions executable by a processor to identify a tone of a UE, the tone satisfying an impairment value, select, based on the tone, a reference signal tone pattern for communicating reference signals between the UE and the base station, and transmit a configuration signal to the UE indicating the reference signal tone pattern.

In some examples of the method, apparatuses, and non-transitory computer-readable medium described herein, identifying the tone may include operations, features, means, or instructions for receiving a signal from the UE identifying the tone.

In some examples of the method, apparatuses, and non-transitory computer-readable medium described herein, identifying the tone may include operations, features, means, or instructions for receiving a signal from the UE identifying the reference signal tone pattern, where the reference signal tone pattern may be selected based on the signal.

In some examples of the method, apparatuses, and non-transitory computer-readable medium described herein, identifying the tone may include operations, features, means, or instructions for receiving a signal from the UE identifying an offset configuration for a baseline reference signal tone pattern, where the reference signal tone pattern may be selected based on the offset configuration.

In some examples of the method, apparatuses, and non-transitory computer-readable medium described herein, the offset configuration includes a bit or field configured to indicate a request for an offset from the baseline reference signal tone pattern.

In some examples of the method, apparatuses, and non-transitory computer-readable medium described herein, the offset configuration includes a bit or field configured to indicate a request for the base station to select the reference signal tone pattern.

In some examples of the method, apparatuses, and non-transitory computer-readable medium described herein, the offset configuration includes information identifying a difference between a baseline reference signal tone pattern and the tone.

In some examples of the method, apparatuses, and non-transitory computer-readable medium described herein, the difference includes a time-frequency difference.

In some examples of the method, apparatuses, and non-transitory computer-readable medium described herein, the difference includes an indication to delete one or more tones from the baseline reference signal tone pattern.

Some examples of the method, apparatuses, and non-transitory computer-readable medium described herein may further include operations, features, means, or instructions for identifying the baseline reference signal tone pattern based on one or more of a previously used reference signal tone pattern, or a grant signal carried in a DCI message, or a configured baseline reference signal tone pattern.

In some examples of the method, apparatuses, and non-transitory computer-readable medium described herein, selecting the reference signal tone pattern may include operations, features, means, or instructions for selecting, based on the tone, the reference signal tone pattern from a set of available reference signal tone patterns, where the configuration signal identifies the selected reference signal tone pattern.

In some examples of the method, apparatuses, and non-transitory computer-readable medium described herein, the signal includes an indication of whether the base station may be to select the reference signal tone pattern.

In some examples of the method, apparatuses, and non-transitory computer-readable medium described herein, identifying the tone may include operations, features, means, or instructions for identifying a UE tone for communications between the UE and the base station, where the UE tone corresponds to the tone.

Some examples of the method, apparatuses, and non-transitory computer-readable medium described herein may further include operations, features, means, or instructions for communicating the reference signals with the UE according to the reference signal tone pattern.

Some examples of the method, apparatuses, and non-transitory computer-readable medium described herein may further include operations, features, means, or instructions for communicating data between the UE and the base station, where the data may be decoded based on the reference signals.

In some examples of the method, apparatuses, and non-transitory computer-readable medium described herein, the communicating includes uplink communications, downlink communications, or a combination thereof.

In some examples of the method, apparatuses, and non-transitory computer-readable medium described herein, the configuration signal may be transmitted in a DCI message.

In some examples of the method, apparatuses, and non-transitory computer-readable medium described herein, the tone includes one or more of a receive DC tone of the UE, or a tone satisfying an SNR threshold, or a tone satisfying an interference level threshold, or a combination thereof.

BRIEF DESCRIPTION OF THE DRAWINGS

FIG. 3 illustrates an example of a table configuration that supports reference signal tone location shift in accordance with aspects of the present disclosure.

DETAILED DESCRIPTION

Figure 1:
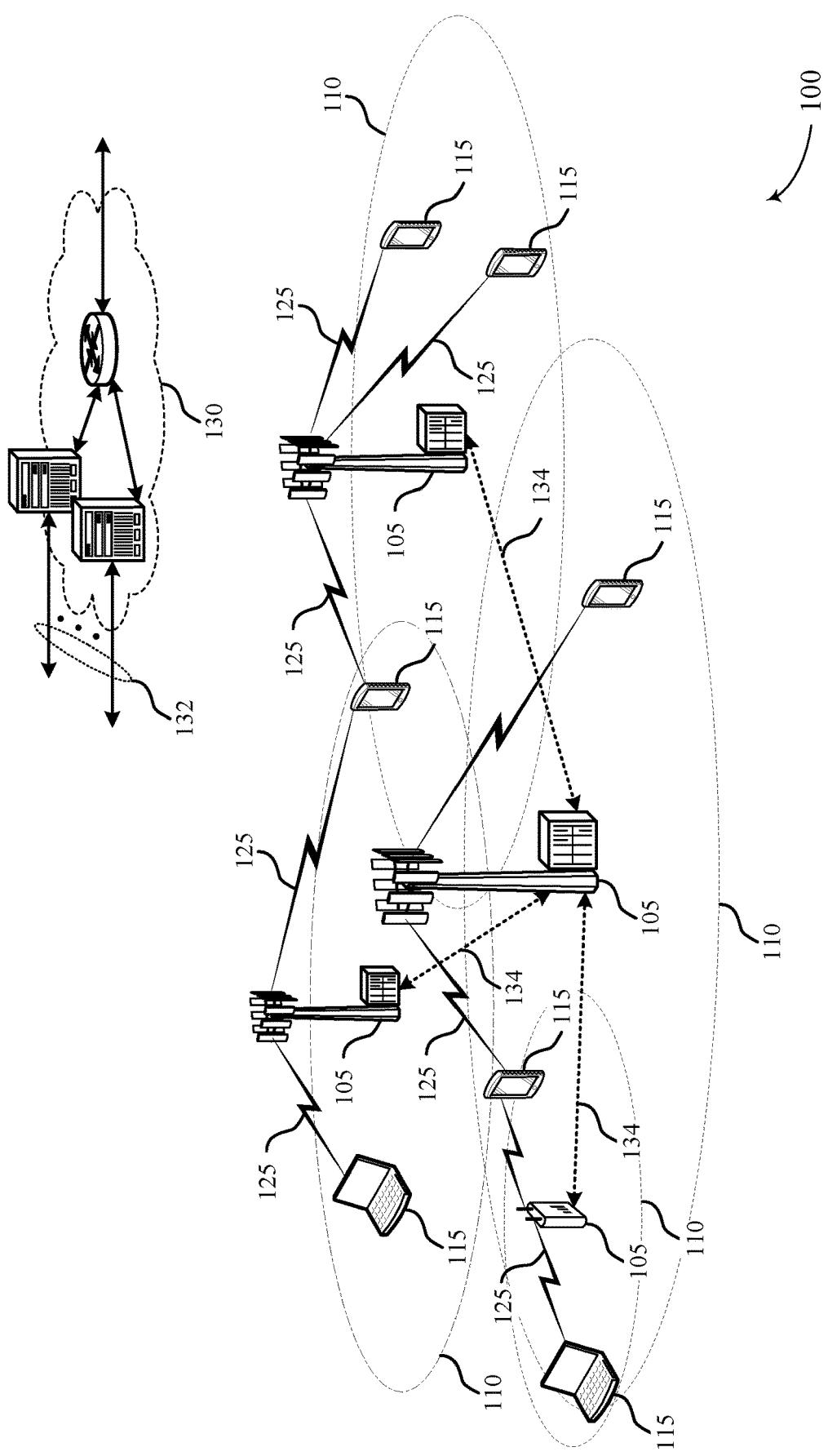
FIG. 1 illustrates an example of a system for wireless communications that supports reference signal tone location shift in accordance with aspects of the present disclosure.

In some aspects, wireless communication systems may utilize reference signals (e.g., tones) for channel measurement and performance feedback. There are many different types of reference signals, each with its own purpose and/or corresponding strengths and weaknesses. As one example, a direct current (DC) tone may be associated with increased background noise, or signal-to-noise ratio (SNR), and the like. As another example, a phase tracking reference signal (PTRS) may be more susceptible to interference. For example, interference may disrupt the phase tracking information provided by the PTRS. Conventionally, wireless devices that are communicating with the each other (e.g., a user equipment (UE) and a base station) schedule reference signals to avoid interference. In some scenarios, the UE may be receiving other reference signals (e.g., tones) from a neighboring device that the base station is unaware of. For example, the UE may be receiving a tone (e.g., any transmission that has an associated impairment value at the UE) from the neighboring device on a particular resource. The base station, unaware of that particular resource, may schedule other transmissions over the resource, which may result in interference that causes a loss of communications between the base station and the UE. As another example, the UE may identify a tone that would be particularly beneficial (e.g., as a high SNR value) and would like for the base station to use the tone for communication with the UE. Conventional wireless communication systems do not provide a mechanism where the UE can inform the base station of the tone.

Aspects of the disclosure are initially described in the context of a wireless communication system. Broadly, the described techniques provide for an efficient mechanism for a UE to inform a base station about a tone that has a given impairment value or threshold. The base station, based on this knowledge, can schedule communications around the resources of an interfering tone or can use the resources associated with a beneficial tone. For example, the UE may identify the tone and select configuration information for communicating with the base station in response. In some aspects, the configuration information may be an identifier of the resources of the tone, an identifier of resources that overlap or do not overlap with the resources of the tone, and the like. In some aspects, the UE may determine whether the tone generates or otherwise contributes to interference beyond an interference threshold level (e.g., is an interfering tone). If not, the UE may continue to perform communications with the base station as normal.

If the tone does generate or otherwise contribute to the interference beyond the interference threshold value, the UE may selectively transmit a signal to the base station that includes or otherwise provides an indication of the configuration information. For example, the UE may transmit a signal that identifies a tone, that identifies a preferred reference signal tone pattern of the UE (e.g., on overlapping or non-overlapping resources), that identifies an offset configuration (e.g., an amount of offset from a baseline reference signal tone pattern), and the like. In one example, the UE may select and provide an indication to the base station of a transmit UE tone that is the same as the tone satisfying the impairment value (e.g., to provide an implicit indication identifying the tone). The base station may identify the tone and select a reference signal tone pattern to use for communicating with the UE based on the tone. The base station may transmit a configuration signal to the UE that includes or otherwise provides an indication of the reference signal tone pattern. The UE and base station may perform communications in accordance with the reference signal tone pattern.

Aspects of the disclosure are further illustrated by and described with reference to apparatus diagrams, system diagrams, and flowcharts that relate to reference signal tone location shift.

FIG. 1 illustrates an example of a wireless communications system 100 that supports reference signal tone location shift in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometer (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may identify a tone satisfying an impairment value. The UE 115 may select configuration information for communicating with a base station 105 based on the tone. The UE 115 may selectively transmit a signal to the base station 105 indicating the configuration information. The UE 115 may receive a configuration signal from the base station 105 indicating a reference signal tone pattern for communicating reference signals between the UE 115 and the base station 105.

Additionally or alternatively, a base station 105 may identify a tone satisfying an impairment value. The base station 105 may select, based on the tone, a reference signal tone pattern for communicating reference signals between the UE 115 and the base station 105. Accordingly, the base station 105 may transmit a configuration signal to the UE 115 indicating the reference signal tone pattern.

Figure 2:
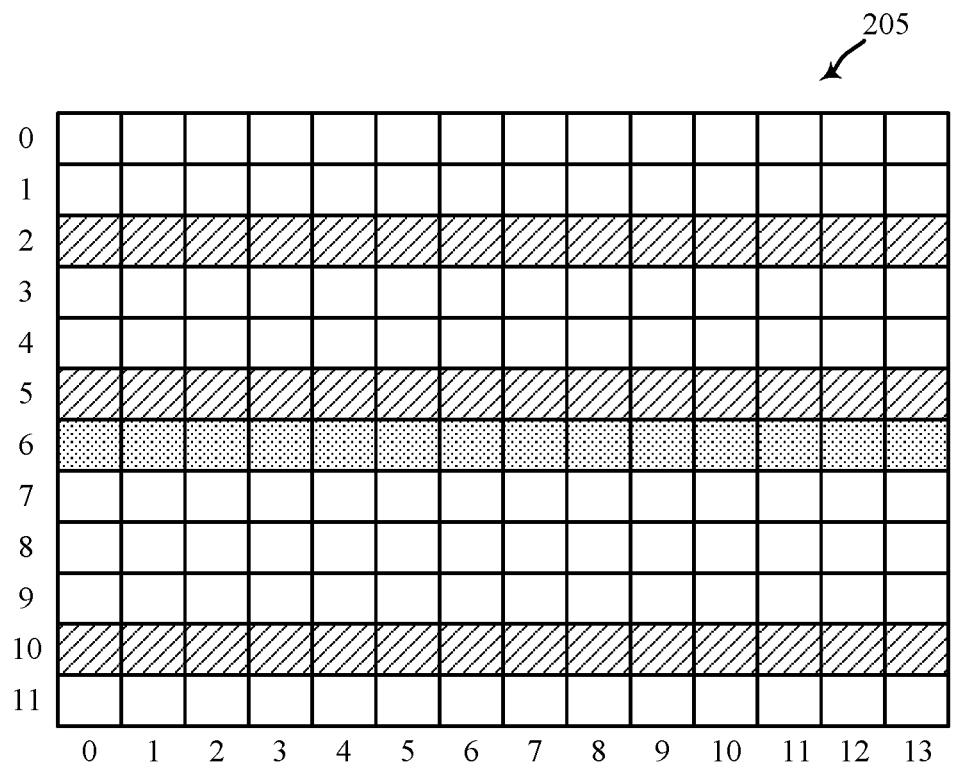
FIG. 2 illustrates an example of a resource block (RB) configuration that supports reference signal tone location shift in accordance with aspects of the present disclosure.

FIG. 2 illustrates an example of an RB configuration 200 that supports reference signal tone location shift in accordance with aspects of the present disclosure. In some examples, RB configuration 200 may implement aspects of wireless communication system 100. Aspects of an RB configuration 200 may be implement a by a base station 105 and/or a UE 115, which may be examples of corresponding devices described herein.

Generally, RB configuration 200 illustrates an example of an RB 205 in accordance with various aspects of the described techniques. Generally, the RB 205 may include a set of tones (with 12 tones being illustrated by way of example only and labeled as 0-11 on the vertical axis) and a set of symbols (with 14 symbols being illustrated by way of example only and labeled as 0-13 on the horizontal axis). Generally, it is to be understood that different RB configurations may be used in accordance with the described techniques, with each RB configuration having more or fewer tones and/or more or fewer symbols.

In some aspects, the base station 105 and UE 115 may be configured to perform wireless communications over one or more of RBs 205. In some examples, these wireless communications may include communicating reference signals, such as one or more tone for a PTRS 210, between the UE 115 and the base station 105 on one or more tones of RB 205. In the example FIG. 2, tones in 2, 5, and 10 are used for communicating PTRS 210 between the base station 105 and UE 115. Different tones may be used for communicating the PTRS 210.

In some aspects, the base station 105 may identify a tone 215 that satisfies an impairment value. Generally, the tone 215 may refer to any transmission type that satisfies the impairment value. In some examples, the tone 215 may refer to a receive DC tone of the UE 115. For example, the UE 115 may receive the tone 215 from a neighbor device (e.g., a neighboring UE 115, neighboring base station 105, etc.). In some aspects, the base station 105 may not be aware of tone 215 (e.g., the base station 105 may not know which frequency and/or time resource tone 215 is being transmitted on).

Generally, satisfying an impairment value may refer to tone 215 having a defined SNR threshold (e.g., a tone having a high SNR, such as a beneficial tone, or tone having a low SNR, such as an interfering tone). In some aspects, the impairment value may refer to tone 215 satisfying an interference level threshold. Additionally or alternatively, the impairment value may refer to tone 215 being a beneficial tone (e.g., a tone that the UE 115 wishes to use to perform communications of reference signal with the base station 105). In other examples, the impairment value may refer to tone 215 being an interfering tone (e.g., a tone that the UE 115 wishes to avoid using to perform communications with the base station 105). In the example FIG. 2, tone 215 is being transmitted on tone 6 of the RB 205, although could be present on other tones of RB 205.

In some aspects, the base station 105 may identify the tone 215 that satisfies the impairment value. In some aspects, this identification may include the base station 105 receiving a signal from the UE 115 that identifies the tone 215 (e.g., the UE 115 may explicitly signal an indication of the tone 215). In some aspects, the base station 105 may receive a signal from the UE 115 that identifies a reference signal tone pattern (e.g., identifies one or more reference signal tone patterns from a set of available reference signal tone patterns that the base station 105 can select from). In some aspects, the base station 105 may receive a signal from the UE 115 that further includes, for each identified reference signal tone pattern, an indication of whether or not the UE 115 wishes to use the reference signal tone pattern. For example, the UE 115 may configure the signal to identify the reference signal tone pattern (e.g., using one or 2 bits) and also to convey an indication of whether the UE 115 wants the base station 105 to select the identified reference signal tone pattern (e.g., using a one bit set to '0' to indicate using the reference signal tone pattern or set to '1' to indicate do not use the reference signal tone pattern, or vice versa).

In some aspects, the base station 105 may receive a signal from the UE 115 that identifies an offset configuration for a baseline reference signal tone pattern. Generally, the offset configuration may include a bit or field configured to indicate a request for an offset from the baseline reference signal tone pattern, to indicate a request for the base station 105 to select (or not select) the reference signal tone pattern, and the like. In some aspects, the offset configuration may simply provide an indication of the amount of offset (e.g., in terms of resource elements, physical RBs, and the like) with respect to the baseline reference signal tone pattern. In some aspects, the offset configuration may provide the indication of the amount of offset in terms of time and/or frequency with respect to the baseline reference signal tone pattern. In some aspects, the offset configuration may carry or otherwise provide an indication for the base station 105 to delete one or more tones from the baseline reference signal tone pattern.

In some aspects, the baseline reference signal tone pattern may correspond to a previously used reference signal tone pattern (e.g., the most recently used reference signal tone pattern), based on a grant carried in a downlink control information (DCI) message, and/or based on configured information. For example, the base station 105 and/or UE 115 may be configured with a set of available reference signal tone patterns, with one being designated as the baseline reference signal tone pattern.

Based on the tone 215, the base station 105 may select a reference signal tone pattern to use for communicating reference signals between the base station 105 and the UE 115. The base station may transmit a configuration signal to the UE 115 that carries or otherwise provides an indication identifying the selected reference signal tone pattern.

With respect to the UE 115, the UE 115 may also or alternatively identify tone 215 satisfying the impairment value. The UE 115 may select configuration information for communicating with the base station 105 based on tone 215. In some aspects, the configuration information may refer to an indication identifying the tone 215, identifying the reference signal tone pattern (e.g., a preferred reference signal tone pattern of the UE 115), an indication of the offset configuration, and the like. The UE 115 may selectively transmit a signal to the base station 105 that carries or otherwise provides an indication of the configuration information. Selectively transmitting the signal may generally refer to the UE 115 transmitting the signal in some scenarios, but not transmitting the signal in other scenarios. As one example, the UE 115 may determine whether tone 215 satisfies or does not satisfy an interference level threshold and transmit the signal when the tone 215 satisfies the interference level threshold. Other examples may also be considered.

In some aspects, the UE 115 may receive the configuration signal from the base station 105 and perform wireless communications with the base station 105 based on the indicated reference signal tone pattern. As one example where the reference signals refer to PTRS 210, the UE 115 and/or base station 105 may decode exchanged data based on the phase information provided by PTRS 210.

In some aspects, the UE 115 may send a bit to let the base station 105 know if the UE 115 is requesting a different reference signal tone pattern than the baseline reference signal tone pattern (e.g., a signal configured to indicate '1' may signal a request to change and a signal configured to indicate '0' may signal a request to not change). For example, if the UE 115 sends a signal that indicates '0,' the signal may further indicate that the UE 115 continues operating with the baseline reference signal tone pattern.

In some aspects, the UE 115 may first select a reference signal tone pattern from candidate patterns (e.g., the set of available reference signal tone patterns) and may report the selected reference signal tone pattern together with an indication of whether the UE 115 prefers or disallows the reference signal tone pattern. For example, the UE 115 may use three bits in the signal, with the first bit set to '0' to indicate that the UE 115 prefers the reference signal tone pattern and set to '1' to indicate that the UE 115 disallows the reference signal tone pattern. In some aspects, the next two bits may be a downlink PTRS resource element offset (DL-PTRS-RE-Offset) (e.g., an offset configuration, discussed in more detail below with reference to FIG. 3), which indicates (e.g., identifies) the selected reference signal tone pattern.

In some aspects, the described techniques may provide a mechanism for a base station 105 to be able to identify which tone is not preferred by a UE 115 (e.g., the receive DC tone or interfering tone at the UE 115 for a transmission or deep fading tone). In some aspects, the base station 105 may identify the interfering tone by a predefined method (e.g., using configured information) or by UE signaling (e.g., the UE 115 tells the base station 105 explicitly, the UE 115 tells the base station 105 if a tone shift on top of a predefined baseline reference signal tone pattern is needed/how much of a shift in tones is needed/how much shift in physical resource blocks (PRBs) are needed, and the like). In some aspects, the base station 105 may determine the tones for PTRS 210 (e.g., the reference signal tone pattern) to avoid the DC tone (e.g., the interfering tone).

In some aspects, the base station 105 may identify a first subset of at least one tone (e.g., the interfering tone). In some aspects, the at least one tone may be a DC tone of the receiver at the UE 115 (e.g., from a neighbor wireless device of the UE 115). Additionally or alternatively, the base station 105 may identify the interfering tone based on pre-defined method. For example, the DC tone of the receiver at the UE 115 (e.g., a receive DC tone) may be the same as a DC tone of a transmitter at the UE 115 (e.g., a transmit DC tone based on the UE tone). As another example, the DC tone of the receiver at the UE 115 may be defined in certain fixed location(s) given a scheduled band. For example, the base station 105 may be configured with information identifying the location of DC tones within any given scheduled band being used for communications in the wireless communication system.

In some aspects, the base station 105 may identify the interfering tone based on a second wireless device (e.g., the neighbor wireless device, a second base station 105 associated with the neighbor wireless device, etc.) sending some signaling indicating information relating to the DC tone locations (e.g., in RRC signaling, physical uplink control channel (PUCCH) signaling, etc.).

In some aspects, the base station 105 may identify the interfering tone based on the UE 115 sending a request for a location shift (e.g., offset configuration) on top of a baseline selection of tone locations (e.g., a baseline reference signal tone pattern), based on which the first subset of tones are identified (e.g., in RRC, PUCCH, etc.). In some aspects, the request may be a bit indicating if the shift is needed (e.g., if there is any overlap with the first subset of tones and the baseline selection tones). Additionally or alternatively, the request may define the difference from the first subset of tones to the baseline selection of tone locations. In some aspects, the baseline selection of tone locations (e.g., the baseline reference signal tone pattern) may be a predefined pattern. Additionally or alternatively, the baseline selection may be the tone locations used in an earlier transmission for tones of PTRS 210.

In some aspects, the UE 115 may send signaling to the base station 105 to assist the base station 105 in identifying the first subset of tones (e.g., the interfering tone). For example, the UE 115 may send signaling indicating where the interfering tone(s) are located.

As another example, the UE 115 may send a request for a location shift on top of a baseline selection of tone locations (e.g., an offset configuration with respect to a baseline reference signal tone pattern) based on which the first subset of tones can be identified. The request may be a bit indicating if the shift is needed (e.g., if there is any overlap with the first subset of tones and the baseline selection tones). Additionally or alternatively, the request may define the difference from the first subset of tones to the baseline selection of tone locations. For example, the request may indicate a shift by X resource elements, Y RBs on top of the baseline selection of tone locations (e.g., with respect to the baseline reference signal tone pattern), or a combination thereof. As another example, the request may indicate a request to drop certain tone(s) from the baseline selection of tone locations. In some aspects, the baseline selection of tone locations may be a predefined pattern (e.g., implemented in relevant standards). In some aspects, the baseline selection may be the tone locations used in a previous transmission for tones of PTRS 210 (e.g., the most recent transmission tone pattern for PTRS 210). Additionally or alternatively, the baseline may be a DCI defined pattern. In some aspects, the UE 115 may send signaling when the UE 115 anticipates that the DC tone will affect PTRS performance (e.g., the interfering tone satisfies an interference level threshold).

In some aspects, the base station 105 may select tones for PTRS 210 (e.g., the reference signal tone pattern) based on the identified first subset of tones (e.g., the interfering tone). For example, the base station 105 may schedule resources for the transmission of PTRS 210 that avoids putting PTRS 210 on the first subset of tones. As another example, the base station 105 may select the first subset of tones for the tones of PTRS 210.

In some aspects, the base station 105 may indicate the selection of the selected tone locations for PTRS 210 to the UE 115 (e.g., using a configuration signal, such as DCI). Additionally, the base station 105 may transmit PTRS 210 together with data based on the selected tone locations for PTRS 210. The base station 105 and the UE 115 may communicate PTRS 210 and data based on the indication (e.g., may decode the data at least in part based on the phase estimation using PTRS 210).

FIG. 3 illustrates an example of a table configuration 300 that supports reference signal tone location shift in accordance with aspects of the present disclosure. In some examples, table configuration 300 may implement aspects of wireless communication system 100 and/or RB configuration 200. Aspects of table 300 may be implemented by a base station 105 and/or a UE 115, which may be examples of the corresponding devices described herein.

Generally, table configuration 300 illustrates an example table 305 that may be implemented in accordance with aspects of the described techniques. As is discussed herein, the UE 115 may selectively transmit a signal to a base station 105 that carries or otherwise provides an indication of configuration information. The UE 115 may select the configuration information based on the tone satisfying an impairment value. In some aspects, table 305 may illustrate an example mechanism where the UE 115 can signal the configuration information based on the information provided in table 305.

For example, table 305 generally may include a first column that corresponds to different antenna ports that can be used for transmitting a demodulation reference signal (DMRS). In the example FIG. 3, table 305 may illustrate six available antenna ports to be used for transmitting the DMRS. However, more or fewer antenna ports may be used in conjunction with aspects of the techniques described herein. The remaining columns of table 305 may be divided between a DMRS configuration type 1 (on the left side) and a DMRS configuration type 2 (on the right side). For each DMRS configuration type, the corresponding columns generally may illustrate the DL-PTRS-RE-Offset for the corresponding antenna ports. Immediately below the downlink PTRS resource element offset fields, two bits may be used to identify different offset configurations. For example, the two bits may be configured as '00,"01,"10,' or '11,' to correspond to different offset configurations. In other scenarios, the two bits may be used to signal an identifier for a particular reference signal tone pattern.

In some aspects, the UE 115 may transmit a signal to the base station 105 that carries or otherwise provides the indication of the configuration information, which may include an indication of an offset configuration and/or identifies the reference signal tone pattern. Generally, the two bits illustrated in table 305 may form some or all of the offset configuration and/or identifier of a reference signal tone pattern signaled by the UE 115.

In some aspects, each column within a respective DMRS configuration type may correspond to a set of available reference signal tone patterns. In some aspects, one or more of the downlink PTRS resource element offset configurations may be associated with a baseline reference signal tone pattern. In one example, the downlink PTRS resource element offset identified using the two bits '00' may be considered or otherwise defined as the baseline reference signal tone pattern. The other columns corresponding to the remaining two bits (e.g., bits '01,' '10,' and '11') may correspond to other reference signal tone patterns that are available for use. Thus, the different columns of table 305 may represent a set of available reference signal tone patterns.

In some aspects, the UE 115 may identify the tone and configure the offset configuration to indicate '01' for DMRS configuration type 1, which may signal the resource element offset with respect to the baseline reference signal tone pattern. As another example, the UE 115 may identify the tone and configure the offset configuration to indicate '11' for DMRS configuration type 2, which may signal the resource element offset with respect to the baseline reference signal tone pattern (e.g., the reference signal tone pattern corresponding to '00' of the DMRS configuration type 2).

In some aspects, an additional bit may be added to the two bits illustrated in table 305 that conveys an indication, for the corresponding reference signal tone pattern, of whether the UE 115 allows or disallows the reference signal tone pattern to be selected by the base station 105. For example, the bit set to '0' may signal that the reference signal tone pattern can be selected, and the bit set to '1' may signal that the reference signal tone pattern is not to be selected, or vice versa.

In some aspects and given a particular frequency density, the base station 105 may determine which tone the PTRS is located on. Additionally, the RBs that contain the PTRS may be decided using a formula. In some cases, sending two bits via RRC signaling may indicate the resource element/tone level offset (e.g., offset configuration) in a physical RB that contains the PTRS. In some aspects, the bits '00' may be defined as a default pattern (e.g., baseline reference signal tone pattern). For example, if $k_{ref}^{RE}$ is not specified, the PTRS tone pattern defined by '00' may refer to the baseline reference signal tone pattern.

Thus, some examples may define the pattern indicated by '00' as the default PTRS pattern (e.g., the baseline reference signal tone pattern). If the DC tone (e.g., the receiver side DC tone) falls on the default PTRS pattern, the UE 115 may use signaling (e.g., using one or two bit(s) of information in RRC, PUCCH, etc.) to inform the base station 105. If the UE 115 expects the DC tone (or any interfering tone) to fall on the PTRS pattern indicated by certain values of DL-PTRS-RE-Offset, then the UE 115 may send a request signal to the base station to request for these values to not be used. In some aspects, the UE 115 may also request to send the PTRS tones indicated with certain values that it prefers (e.g., a preferred UE tone and/or reference signal tone pattern).

Figure 4:
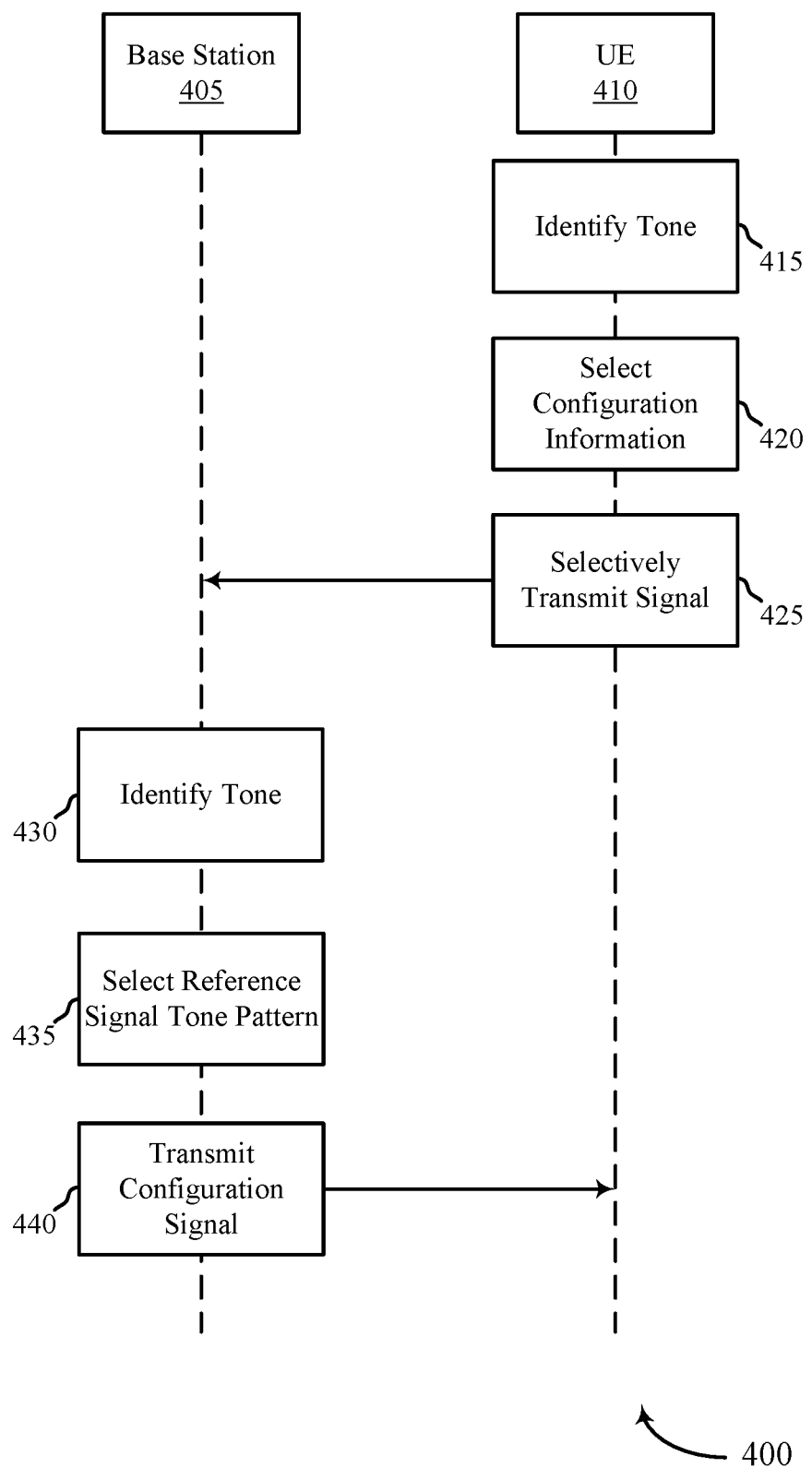
FIG. 4 illustrates an example of a process that supports reference signal tone location shift in accordance with aspects of the present disclosure.

FIG. 4 illustrates an example of a process flow 400 that supports reference signal tone location shift in accordance with aspects of the present disclosure. In some examples, process flow 400 may implement aspects of wireless communication system 100, RB configuration 200, and/or table configuration 300. Process flow 400 may include a base station 405 and a UE 410, which may be examples of corresponding base stations 105 and UEs 115, respectively, as described herein.

At 415, UE 410 may identify a tone that has an associated impairment value satisfying a threshold level. In some aspects, the identified tone may be one or more of a DC tone of the UE 410, a tone satisfying an SNR threshold, and/or a tone satisfying an interference level threshold.

At 420, UE 410 may select configuration information for communicating with base station 405 based on the tone. In some aspects, selecting the configuration information may include UE 410 selecting the reference signal tone pattern from a set of available reference signal tone patterns based on the tone. Additionally or alternatively, selecting the configuration information may include UE 410 identifying a UE tone for communications between the UE 410 and the base station 405 (e.g., the UE tone may correspond to the identified tone).

At 425, UE 410 may selectively transmit (and base station 405 may receive) a signal that carries or otherwise provides an indication of the configuration information. In some aspects, this may include UE 410 transmitting a signal identifying the tone. In some aspects, selectively transmitting the signal may include UE 410 transmitting a signal identifying the reference signal tone pattern (e.g., a preferred reference signal tone pattern of UE 410). Additionally or alternatively, UE 410 may configure the signal to carry or otherwise provide an indication of whether base station 405 is to select or is not to select the reference signal tone pattern that UE 410 selected at 420.

In some aspects, selectively transmitting the signal may include UE 410 transmitting a signal identifying an offset configuration for a baseline reference signal tone pattern. In some cases, the offset configuration may include one or more bits or fields configured to indicate a request for an offset from the baseline reference signal tone pattern, a request for base station 405 to select the reference signal tone pattern, a request for base station 405 to avoid selecting the reference signal tone pattern, and/or information identifying a difference between a baseline reference signal tone pattern and the tone (e.g., a time and/or frequency difference, an indication of one or more tones to be deleted from the baseline reference signal tone pattern, or a combination thereof). In some aspects, UE 410 may identify the baseline reference signal tone pattern based on a previously used reference signal tone pattern, a grant carried in a DCI message, and/or a configured baseline reference signal tone pattern.

In some aspects, UE 410 may selectively transmit the signal based on the determination of whether the tone satisfies an interference level threshold with respect to communications between UE 410 and base station 405. The signal may be transmitted to base station 405 when the tone satisfies the interference level threshold, but not transmitted when the tone does not satisfy the interference level threshold.

At 430, base station 405 may identify the tone having the associated impairment value that satisfies a threshold level. In some aspects, identifying the tone may include base station 405 receiving a signal from UE 410 identifying the tone. Additionally or alternatively, identifying the tone may include base station 405 receiving a signal from UE 410 identifying the reference signal tone pattern.

In some aspects, identifying the tone may include base station 405 receiving a signal from UE 410 identifying an offset configuration for a baseline reference signal tone pattern. In some cases, the offset configuration may include one or more bits or fields configured to indicate a request for an offset from the baseline reference signal tone pattern, a request for the base station to select or not select the reference signal tone pattern, information identifying a difference between the baseline reference signal tone pattern and the identified tone, and the like. In some aspects, the difference may refer to time/frequency resources and/or an indication to delete one or more tones from the baseline reference signal tone pattern.

At 435, base station 405 may select a reference signal tone pattern to use for communicating reference signals between the UE 410 and the base station 405 based on the tone. In some aspects, selecting the reference signal tone pattern may include base station 405 identifying the baseline reference signal tone pattern based on the previously used reference signal tone pattern, a grant signal carried in a DCI message, and/or a configured baseline reference signal tone pattern. For example, base station 405 may select the reference signal tone pattern from a set of available reference signal tone patterns based on this identified tone.

At 440, base station 405 may transmit (and UE 410 may receive) a configuration signal indicating the reference signal tone pattern selected by base station 405. In some aspects, the configuration signal may be communicated in a DCI message.

In some aspects, base station 405 and UE 410 may perform wireless communications of the reference signals according to the reference signal tone pattern. For example, performing the wireless communications may include communicating data between UE 410 and base station 405, with the data being decoded based on the reference signals. Generally, the wireless communications may include uplink communications and/or downlink communications.

Figure 5:
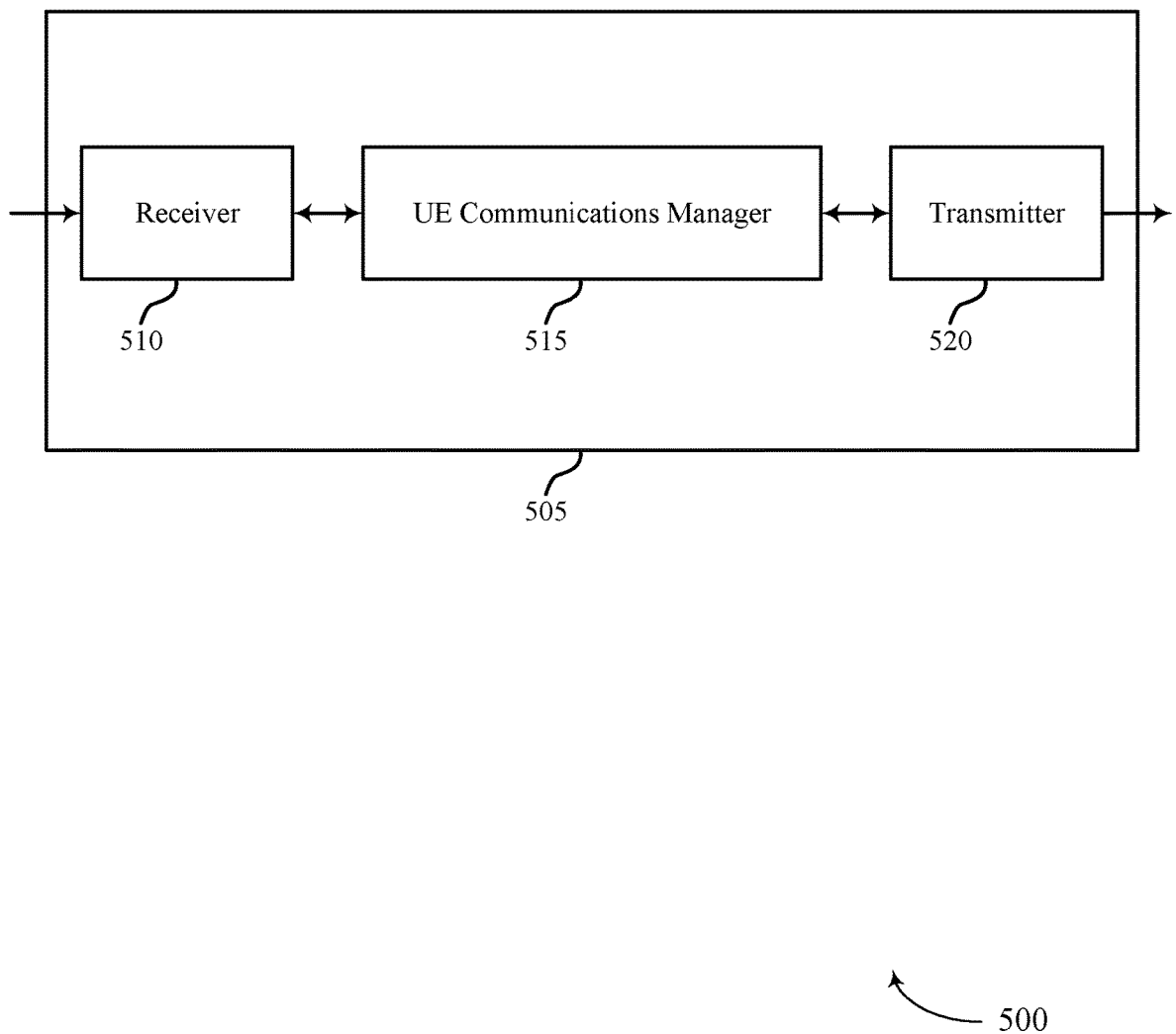
FIGS. 5 and 6 show block diagrams of devices that support reference signal tone location shift in accordance with aspects of the present disclosure.

FIG. 5 shows a block diagram 500 of a device 505 that supports reference signal tone location shift in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal tone location shift, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may identify a tone satisfying an impairment value. Additionally, the UE communications manager 515 may select configuration information for communicating with a base station based on the tone. Subsequently, the UE communications manager 515 may selectively transmit a signal to the base station indicating the configuration information. In some cases, the UE communications manager 515 may receive a configuration signal from the base station indicating a reference signal tone pattern for communicating reference signals between the UE and the base station.

The UE communications manager 515 may be an example of aspects of the UE communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
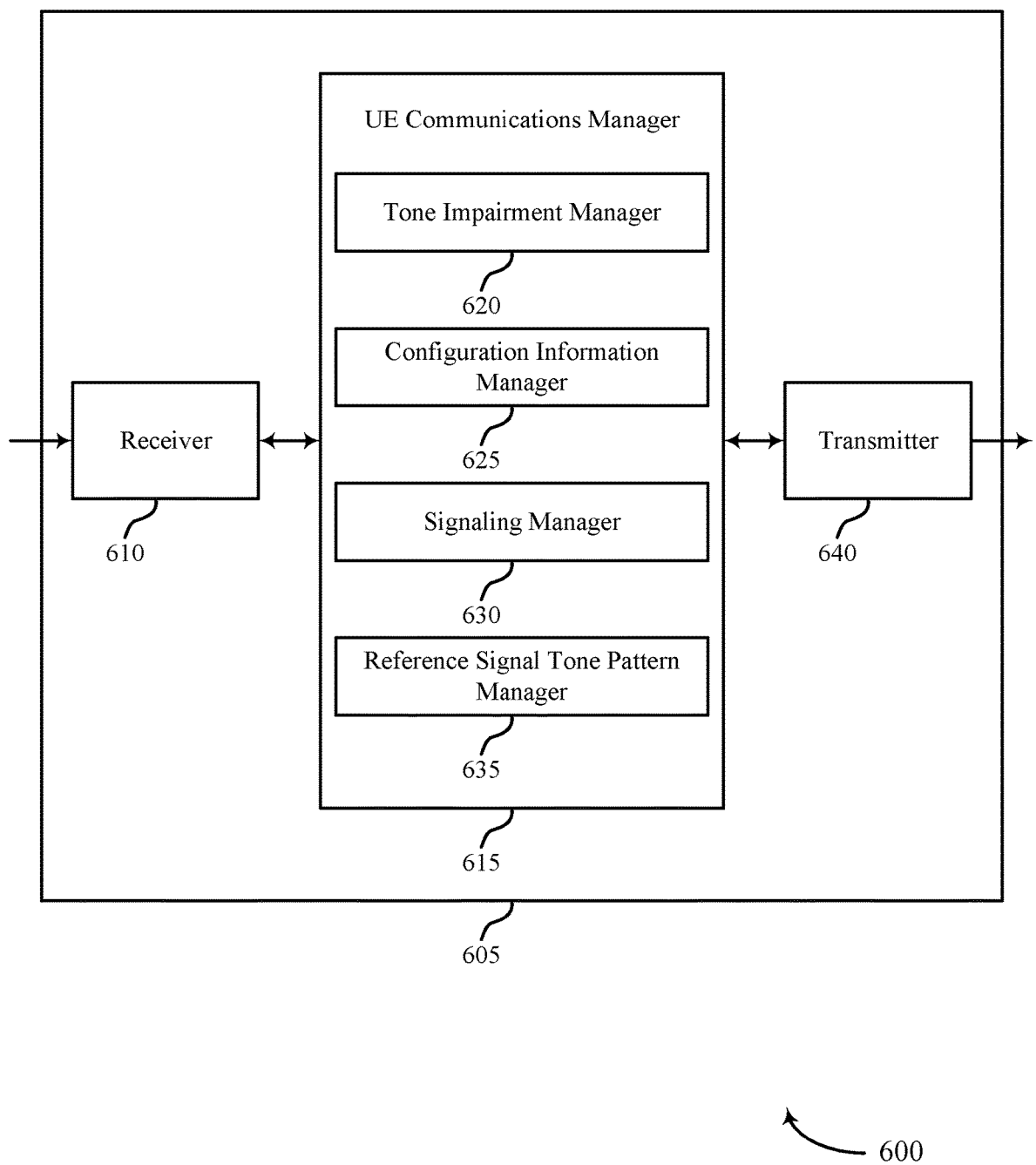

FIG. 6 shows a block diagram 600 of a device 605 that supports reference signal tone location shift in accordance with aspects of the present disclosure. The device 605 may be an example of aspects of a device 505 or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to reference signal tone location shift, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a tone impairment manager 620, a configuration information manager 625, a signaling manager 630, and a reference signal tone pattern manager 635. The UE communications manager 615 may be an example of aspects of the UE communications manager 810 described herein.

The tone impairment manager 620 may identify a tone satisfying an impairment value.

The configuration information manager 625 may select configuration information for communicating with a base station based on the tone.

The signaling manager 630 may selectively transmit a signal to the base station indicating the configuration information.

The reference signal tone pattern manager 635 may receive a configuration signal from the base station indicating a reference signal tone pattern for communicating reference signals between the UE and the base station.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
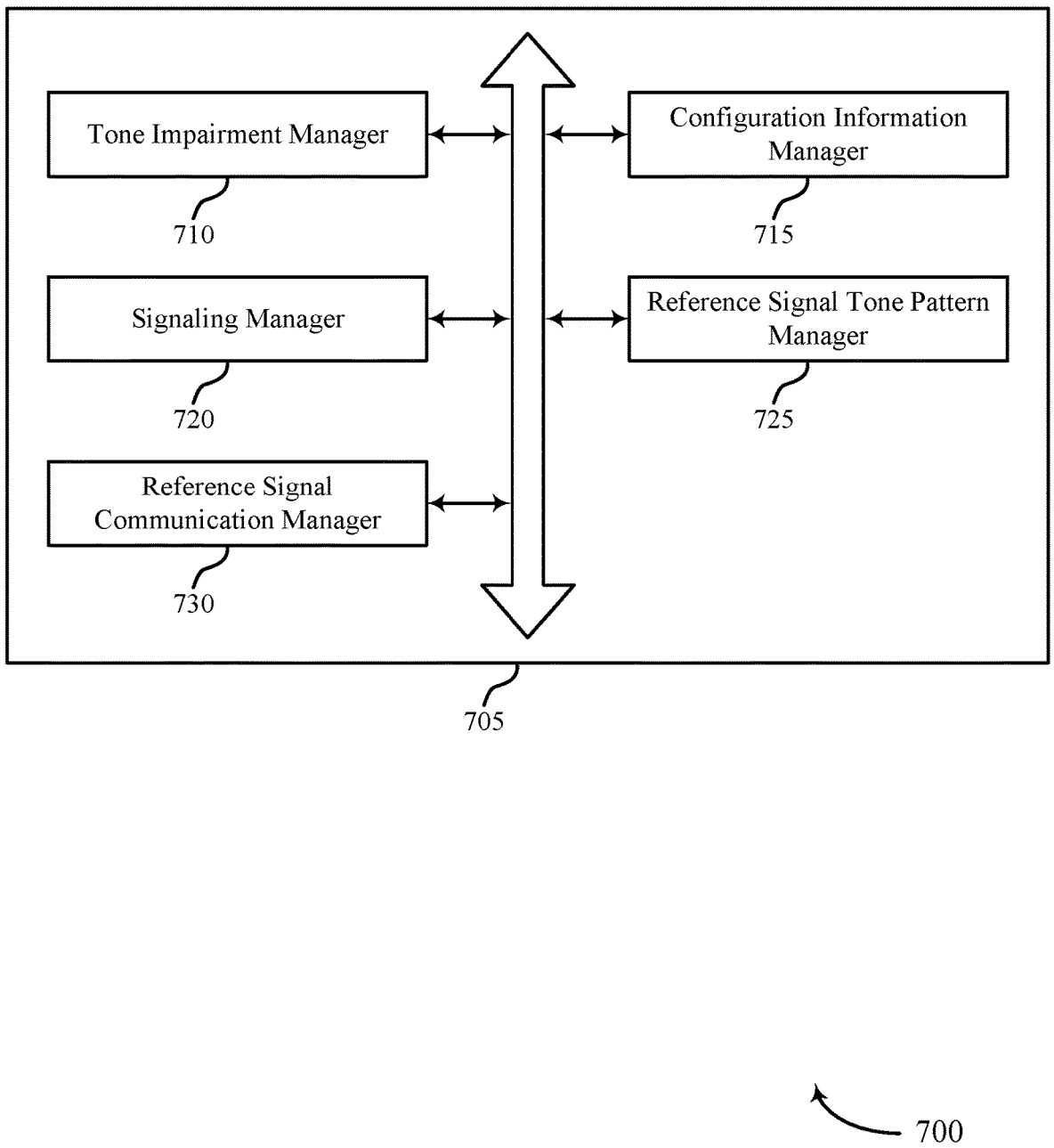
FIG. 7 shows a block diagram of a communications manager that supports reference signal tone location shift in accordance with aspects of the present disclosure.

FIG. 7 shows a block diagram 700 of a UE communications manager 705 that supports reference signal tone location shift in accordance with aspects of the present disclosure. The UE communications manager 705 may be an example of aspects of a UE communications manager 515, a UE communications manager 615, or a UE communications manager 810 described herein. The UE communications manager 705 may include a tone impairment manager 710, a configuration information manager 715, a signaling manager 720, a reference signal tone pattern manager 725, and a reference signal communication manager 730. Each of these modules may communicate, directly or indirectly, with one another (e.g., via one or more buses).

The tone impairment manager 710 may identify a tone satisfying an impairment value. In some cases, the tone may include one or more of a receive DC tone of the UE, or a tone satisfying an SNR threshold, or a tone satisfying an interference level threshold, or a combination thereof.

The configuration information manager 715 may select configuration information for communicating with a base station based on the tone. In some examples, the configuration information manager 715 may select, based on the tone, the reference signal tone pattern from a set of available reference signal tone patterns, where the signal identifies the selected reference signal tone pattern. In some examples, the configuration information manager 715 may identify a UE tone for communications between the UE and the base station, where the UE tone corresponds to the tone. In some cases, the signal may include an indication of whether the base station is to select the reference signal tone pattern.

The signaling manager 720 may selectively transmit a signal to the base station indicating the configuration information. In some examples, the signaling manager 720 may transmit a signal identifying the tone. In some examples, the signaling manager 720 may transmit a signal identifying the reference signal tone pattern. In some examples, the signaling manager 720 may transmit a signal identifying an offset configuration for a baseline reference signal tone pattern, where the reference signal tone pattern is based on the offset configuration. In some examples, the signaling manager 720 may identify the baseline reference signal tone pattern based on one or more of a previously used reference signal tone pattern, or a grant signal carried in a DCI message, or a configured baseline reference signal tone pattern. In some examples, the signaling manager 720 may determine that the tone fails to satisfy an interference level threshold with respect to communications between the UE and the base station, where the signal is not transmitted to the base station based on the determining. In some cases, the offset configuration may include a bit or field configured to indicate a request for an offset from the baseline reference signal tone pattern. Additionally or alternatively, the offset configuration may include a bit or field configured to indicate a request for the base station to select the reference signal tone pattern. In some cases, the offset configuration may include information identifying a difference between a baseline reference signal tone pattern and the tone. Accordingly, in some cases, the difference may includes a time-frequency difference. Additionally or alternatively, the difference may include an indication to delete one or more tones from the baseline reference signal tone pattern.

The reference signal tone pattern manager 725 may receive a configuration signal from the base station indicating a reference signal tone pattern for communicating reference signals between the UE and the base station. In some examples, the reference signal tone pattern manager 725 may determine that the tone satisfies an interference level threshold with respect to communications between the UE and the base station, where the signal is transmitted to the base station based on the determining. In some cases, the configuration signal may be received in a DCI message.

The reference signal communication manager 730 may communicate the reference signals with the base station according to the reference signal tone pattern. In some examples, the reference signal communication manager 730 may communicate data between the UE and the base station, where the data is decoded based on the reference signals. In some cases, the communicating may include uplink communications, downlink communications, or a combination thereof.

Figure 8:
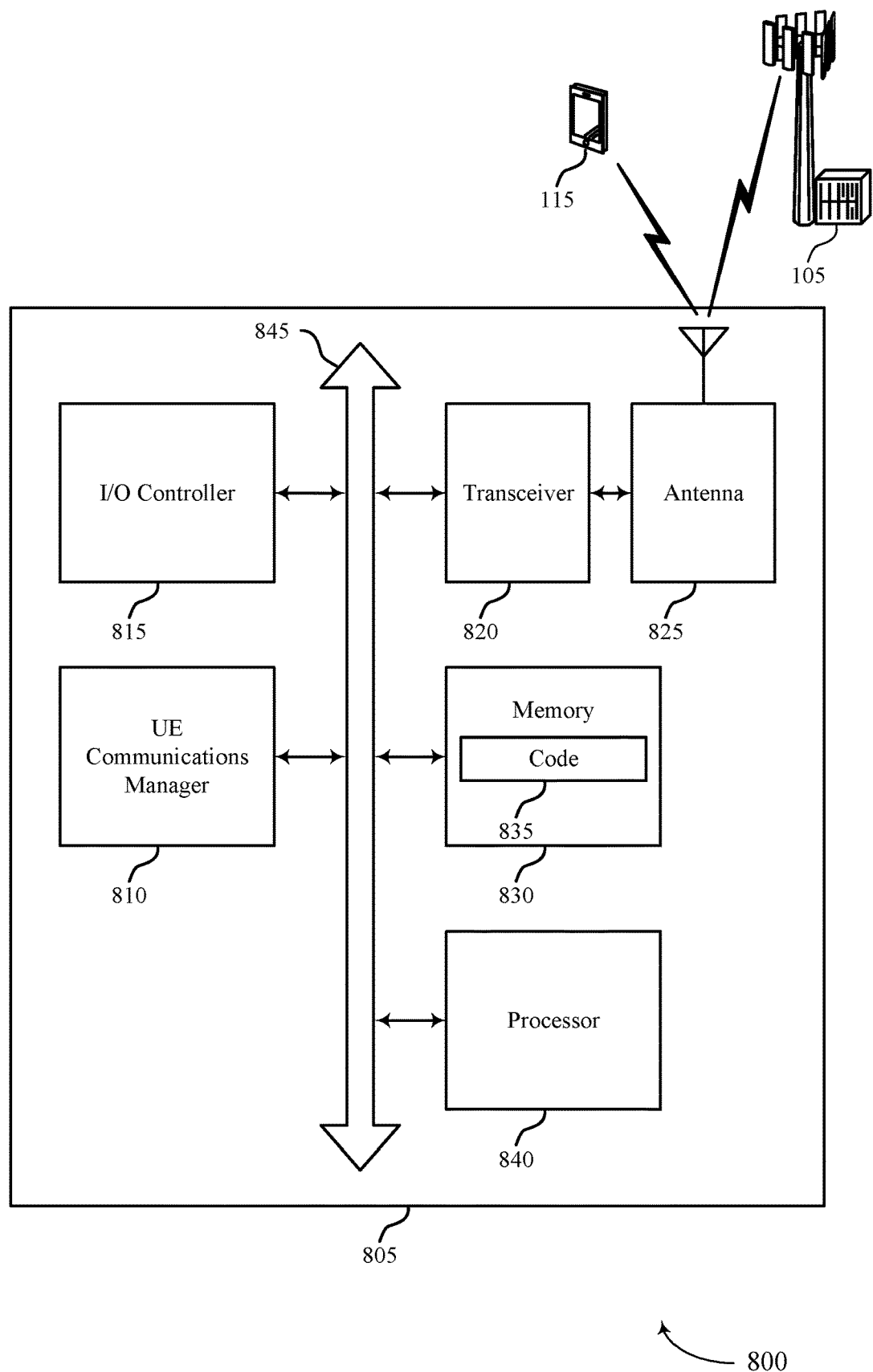
FIG. 8 shows a diagram of a system including a device that supports reference signal tone location shift in accordance with aspects of the present disclosure.

FIG. 8 shows a diagram of a system 800 including a device 805 that supports reference signal tone location shift in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may identify a tone satisfying an impairment value. Additionally, the UE communications manager 810 may select configuration information for communicating with a base station based on the tone. Subsequently, the UE communications manager 810 may selectively transmit a signal to the base station indicating the configuration information. In some cases, the UE communications manager 810 may receive a configuration signal from the base station indicating a reference signal tone pattern for communicating reference signals between the UE and the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal tone location shift).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
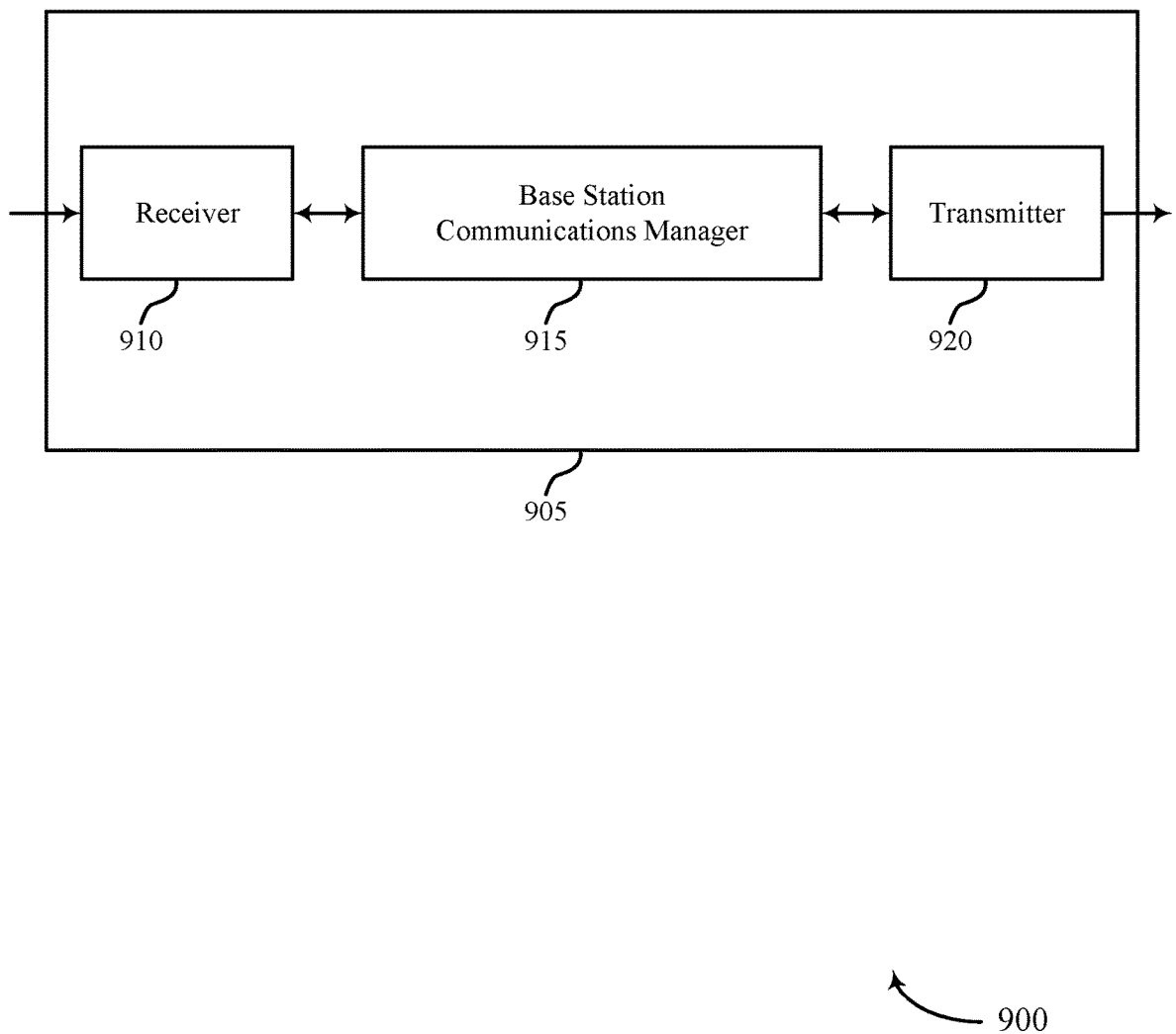
FIGS. 9 and 10 show block diagrams of devices that support reference signal tone location shift in accordance with aspects of the present disclosure.

FIG. 9 shows a block diagram 900 of a device 905 that supports reference signal tone location shift in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal tone location shift, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may identify a tone of a UE, the tone satisfying an impairment value. Additionally, the base station communications manager 915 select, based on the tone, a reference signal tone pattern for communicating reference signals between the UE and the base station. Subsequently, the base station communications manager 915 transmit a configuration signal to the UE indicating the reference signal tone pattern. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
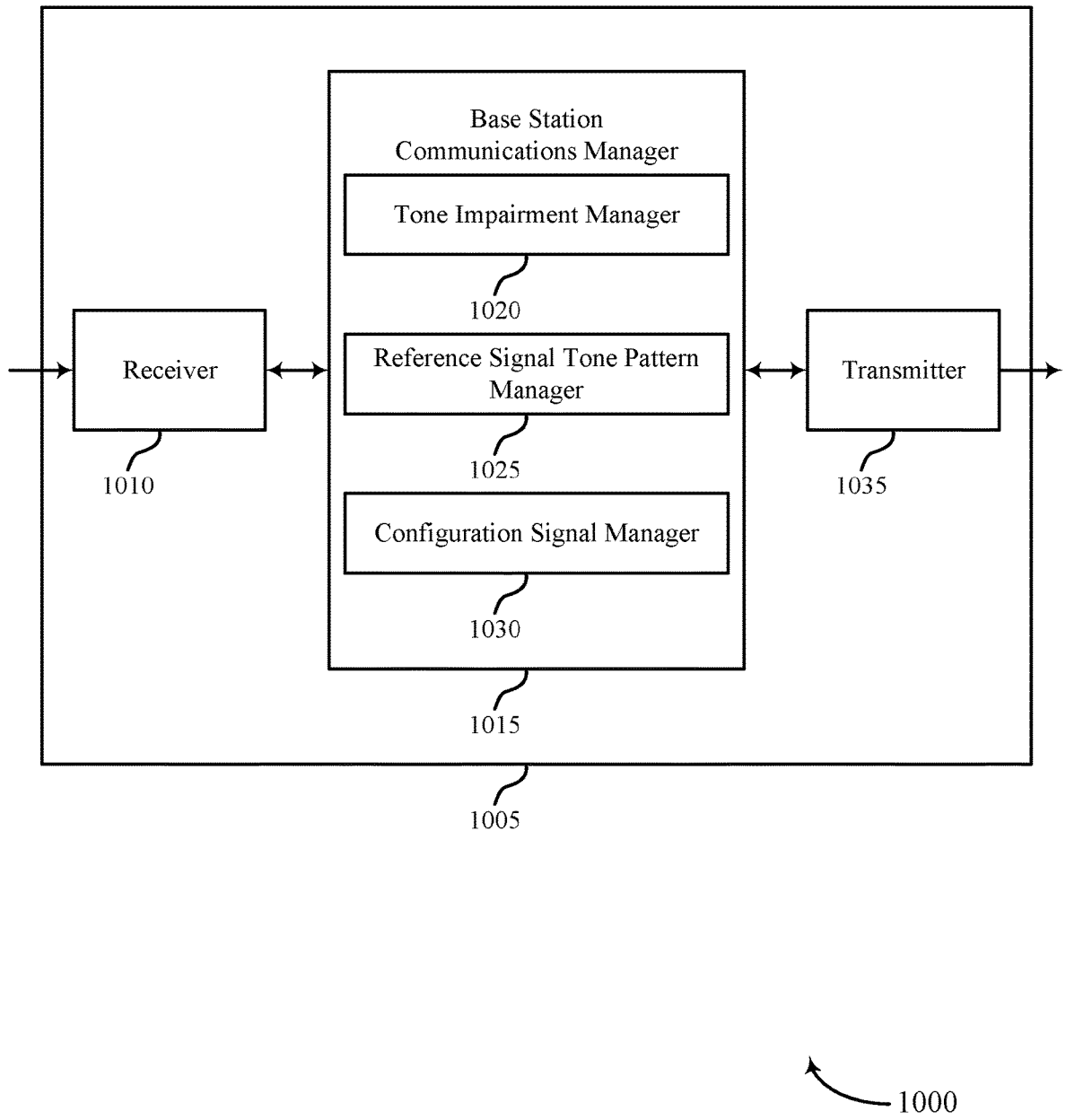

FIG. 10 shows a block diagram 1000 of a device 1005 that supports reference signal tone location shift in accordance with aspects of the present disclosure. The device 1005 may be an example of aspects of a device 905 or a base station 115 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal tone location shift, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a tone impairment manager 1020, a reference signal tone pattern manager 1025, and a configuration signal manager 1030. The base station communications manager 1015 may be an example of aspects of the base station communications manager 1210 described herein.

The tone impairment manager 1020 may identify a tone of a UE, the tone satisfying an impairment value.

The reference signal tone pattern manager 1025 may select, based on the tone, a reference signal tone pattern for communicating reference signals between the UE and the base station.

The configuration signal manager 1030 may transmit a configuration signal to the UE indicating the reference signal tone pattern.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
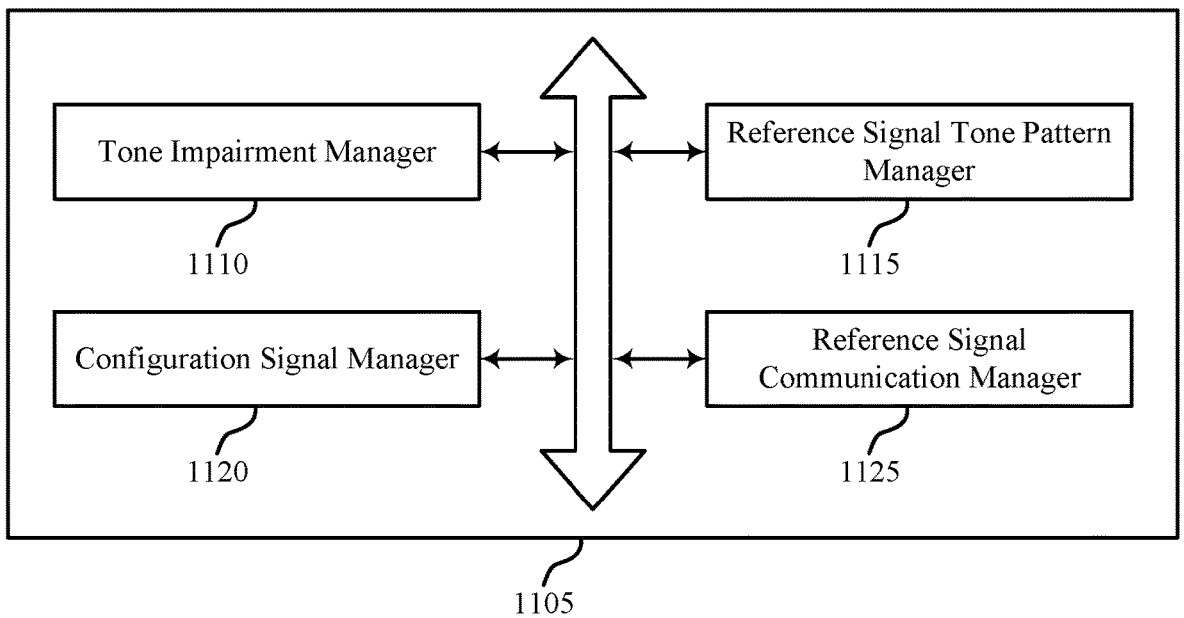
FIG. 11 shows a block diagram of a communications manager that supports reference signal tone location shift in accordance with aspects of the present disclosure.

FIG. 11 shows a block diagram 1100 of a communications manager 1105 that supports reference signal tone location shift in accordance with aspects of the present disclosure. The base station communications manager 1105 may be an example of aspects of a base station communications manager 915, a base station communications manager 1015, or a base station communications manager 1210 described herein. The base station communications manager 1105 may include a tone impairment manager 1110, a reference signal tone pattern manager 1115, a configuration signal manager 1120, and a reference signal communication manager 1125. Each of these modules may communicate, directly or indirectly, with one another (e.g., via one or more buses).

The tone impairment manager 1110 may identify a tone of a UE, the tone satisfying an impairment value. In some examples, the tone impairment manager 1110 may receive a signal from the UE identifying the tone. In some examples, the tone impairment manager 1110 may receive a signal from the UE identifying the reference signal tone pattern, where the reference signal tone pattern is selected based on the signal. In some examples, the tone impairment manager 1110 may receive a signal from the UE identifying an offset configuration for a baseline reference signal tone pattern, where the reference signal tone pattern is selected based on the offset configuration. In some examples, the tone impairment manager 1110 may identify the baseline reference signal tone pattern based on one or more of a previously used reference signal tone pattern, or a grant signal carried in a DCI message, or a configured baseline reference signal tone pattern. In some examples, the tone impairment manager 1110 may identify a UE tone for communications between the UE and the base station, where the UE tone corresponds to the tone. In some cases, the offset configuration may include a bit or field configured to indicate a request for an offset from the baseline reference signal tone pattern. Additionally or alternatively, the offset configuration may include a bit or field configured to indicate a request for the base station to select the reference signal tone pattern. In some cases, the offset configuration may include information identifying a difference between a baseline reference signal tone pattern and the tone. Accordingly, in some cases, the difference may include a time-frequency difference. Additionally or alternatively, the difference may include an indication to delete one or more tones from the baseline reference signal tone pattern. In some cases, the tone may include one or more of a receive DC tone of the UE, or a tone satisfying an SNR threshold, or a tone satisfying an interference level threshold, or a combination thereof.

The reference signal tone pattern manager 1115 may select, based on the tone, a reference signal tone pattern for communicating reference signals between the UE and the base station. In some examples, the reference signal tone pattern manager 1115 may select, based on the tone, the reference signal tone pattern from a set of available reference signal tone patterns, where the configuration signal identifies the selected reference signal tone pattern. In some cases, the signal may include an indication of whether the base station is to select the reference signal tone pattern. In some cases, the configuration signal may be transmitted in a DCI message.

The configuration signal manager 1120 may transmit a configuration signal to the UE indicating the reference signal tone pattern.

The reference signal communication manager 1125 may communicate the reference signals with the UE according to the reference signal tone pattern. In some examples, the reference signal communication manager 1125 may communicate data between the UE and the base station, where the data is decoded based on the reference signals. In some cases, the communicating may include uplink communications, downlink communications, or a combination thereof.

Figure 12:
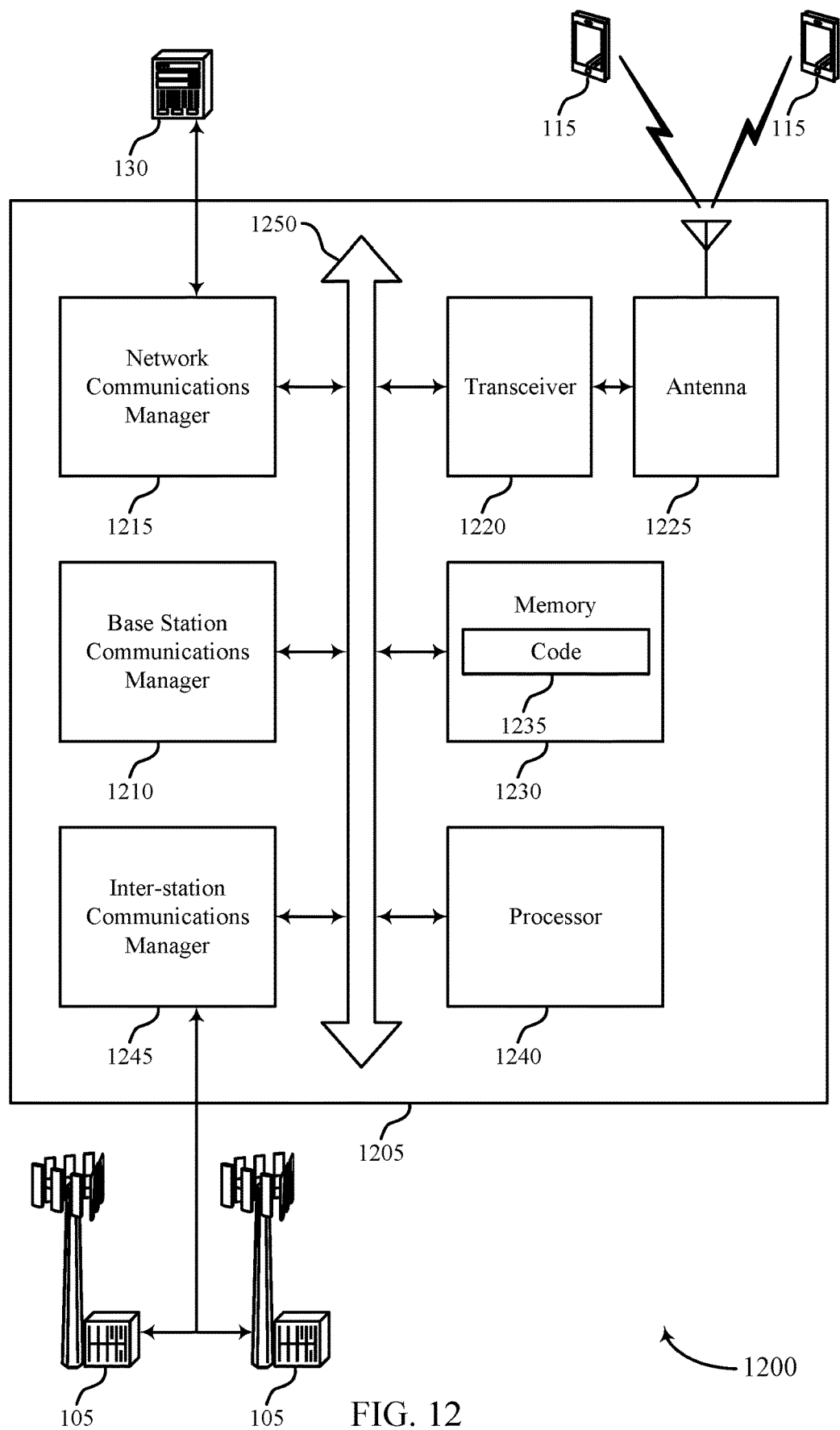
FIG. 12 shows a diagram of a system including a device that supports reference signal tone location shift in accordance with aspects of the present disclosure.

FIG. 12 shows a diagram of a system 1200 including a device 1205 that supports reference signal tone location shift in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may identify a tone of a UE, the tone satisfying an impairment value. Additionally, the base station communications manager 1210 may select, based on the tone, a reference signal tone pattern for communicating reference signals between the UE and the base station. Subsequently, the base station communications manager 1210 may transmit a configuration signal to the UE indicating the reference signal tone pattern.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, aPLD, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal tone location shift).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
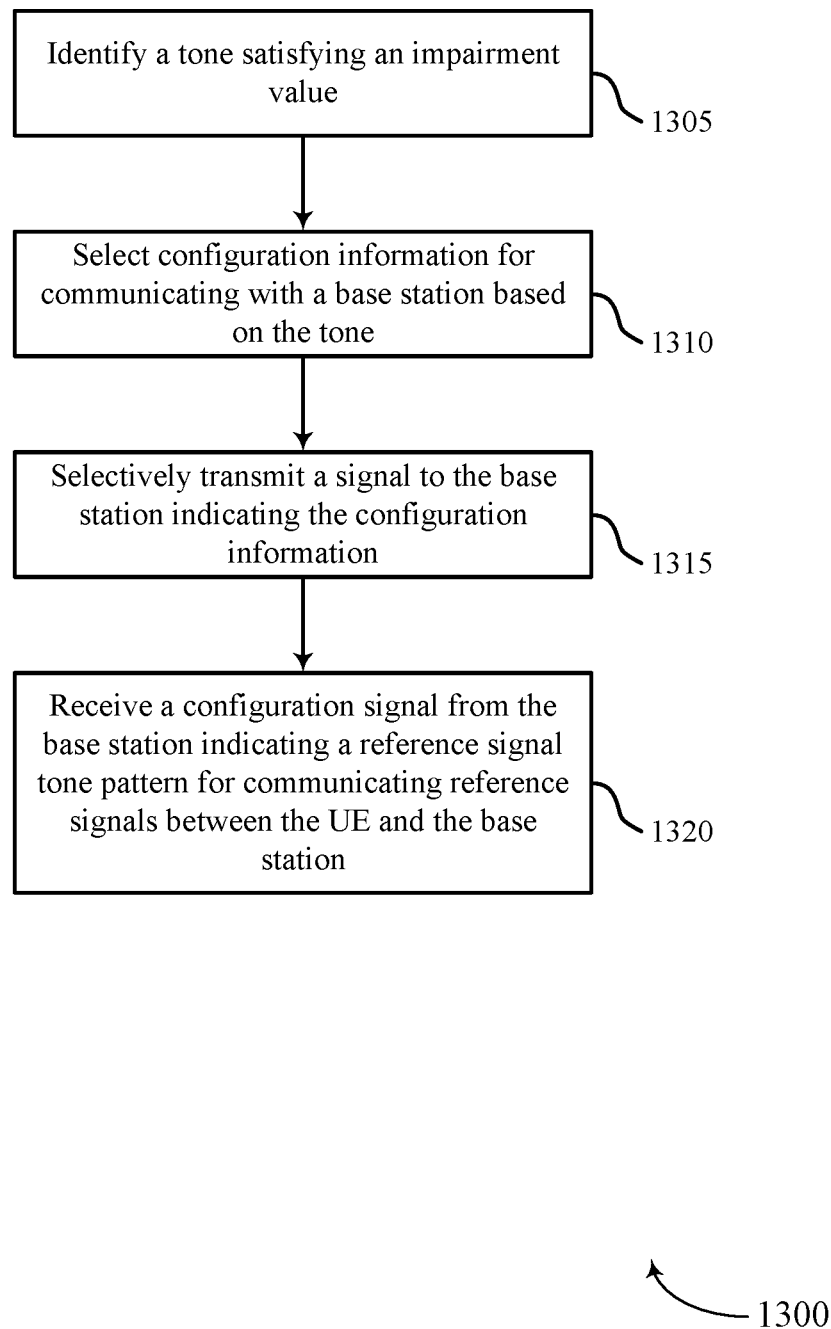
FIGS. 13 through 16 show flowcharts illustrating methods that support reference signal tone location shift in accordance with aspects of the present disclosure.

FIG. 13 shows a flowchart illustrating a method 1300 that supports reference signal tone location shift in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a tone satisfying an impairment value. The operations of 1305 may be performed according to the methods described herein. In some examples, aspects of the operations of 1305 may be performed by a tone impairment manager as described with reference to FIGS. 5 through 8.

At 1310, the UE may select configuration information for communicating with a base station based on the tone. The operations of 1310 may be performed according to the methods described herein. In some examples, aspects of the operations of 1310 may be performed by a configuration information manager as described with reference to FIGS. 5 through 8.

At 1315, the UE may selectively transmit a signal to the base station indicating the configuration information. The operations of 1315 may be performed according to the methods described herein. In some examples, aspects of the operations of 1315 may be performed by a signaling manager as described with reference to FIGS. 5 through 8.

At 1320, the UE may receive a configuration signal from the base station indicating a reference signal tone pattern for communicating reference signals between the UE and the base station. The operations of 1320 may be performed according to the methods described herein. In some examples, aspects of the operations of 1320 may be performed by a reference signal tone pattern manager as described with reference to FIGS. 5 through 8.

Figure 14:
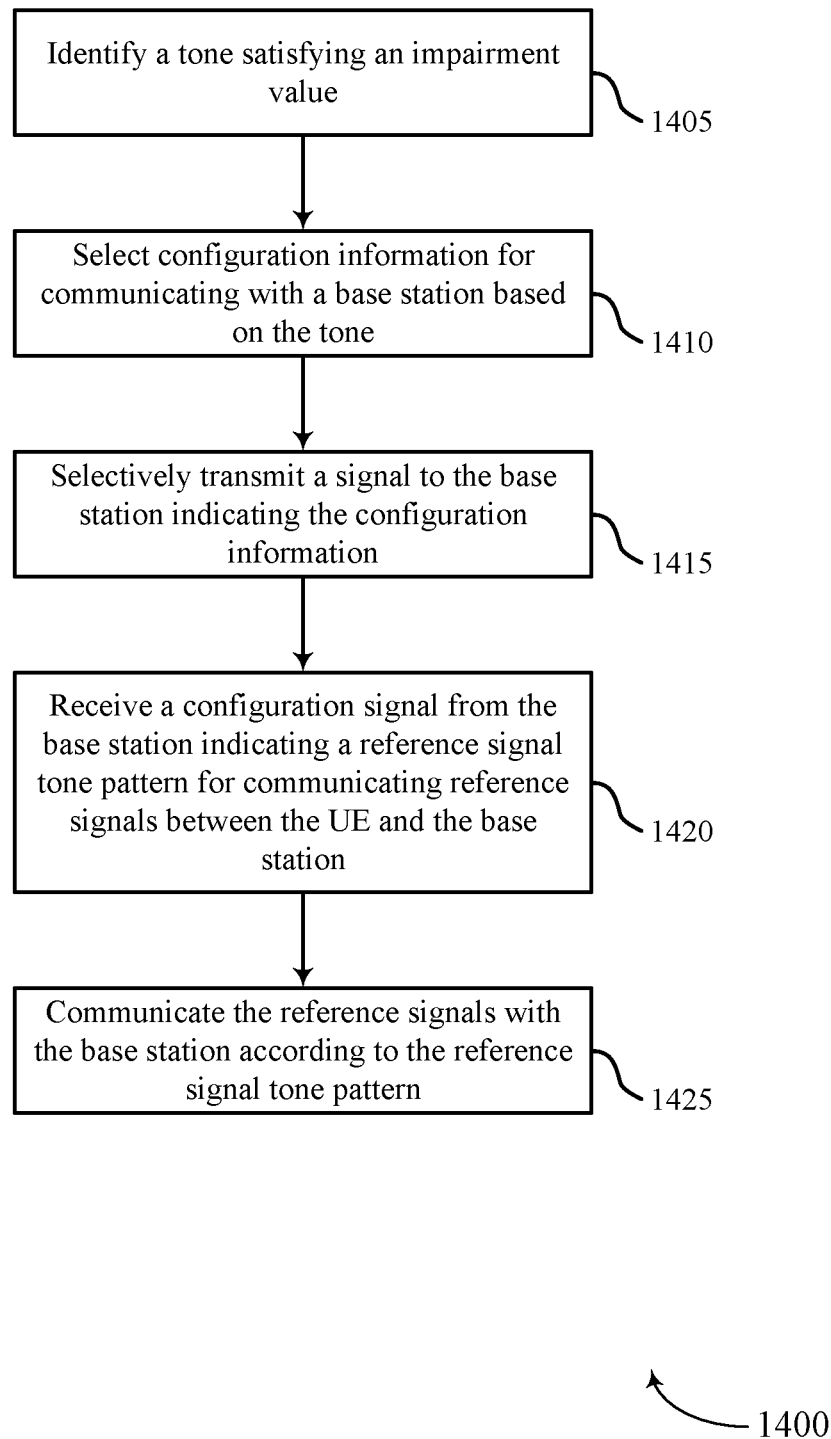

FIG. 14 shows a flowchart illustrating a method 1400 that supports reference signal tone location shift in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a tone satisfying an impairment value. The operations of 1405 may be performed according to the methods described herein. In some examples, aspects of the operations of 1405 may be performed by a tone impairment manager as described with reference to FIGS. 5 through 8.

At 1410, the UE may select configuration information for communicating with a base station based on the tone. The operations of 1410 may be performed according to the methods described herein. In some examples, aspects of the operations of 1410 may be performed by a configuration information manager as described with reference to FIGS. 5 through 8.

At 1415, the UE may selectively transmit a signal to the base station indicating the configuration information. The operations of 1415 may be performed according to the methods described herein. In some examples, aspects of the operations of 1415 may be performed by a signaling manager as described with reference to FIGS. 5 through 8.

At 1420, the UE may receive a configuration signal from the base station indicating a reference signal tone pattern for communicating reference signals between the UE and the base station. The operations of 1420 may be performed according to the methods described herein. In some examples, aspects of the operations of 1420 may be performed by a reference signal tone pattern manager as described with reference to FIGS. 5 through 8.

At 1425, the UE may communicate the reference signals with the base station according to the reference signal tone pattern. The operations of 1425 may be performed according to the methods described herein. In some examples, aspects of the operations of 1425 may be performed by a reference signal communication manager as described with reference to FIGS. 5 through 8.

Figure 15:
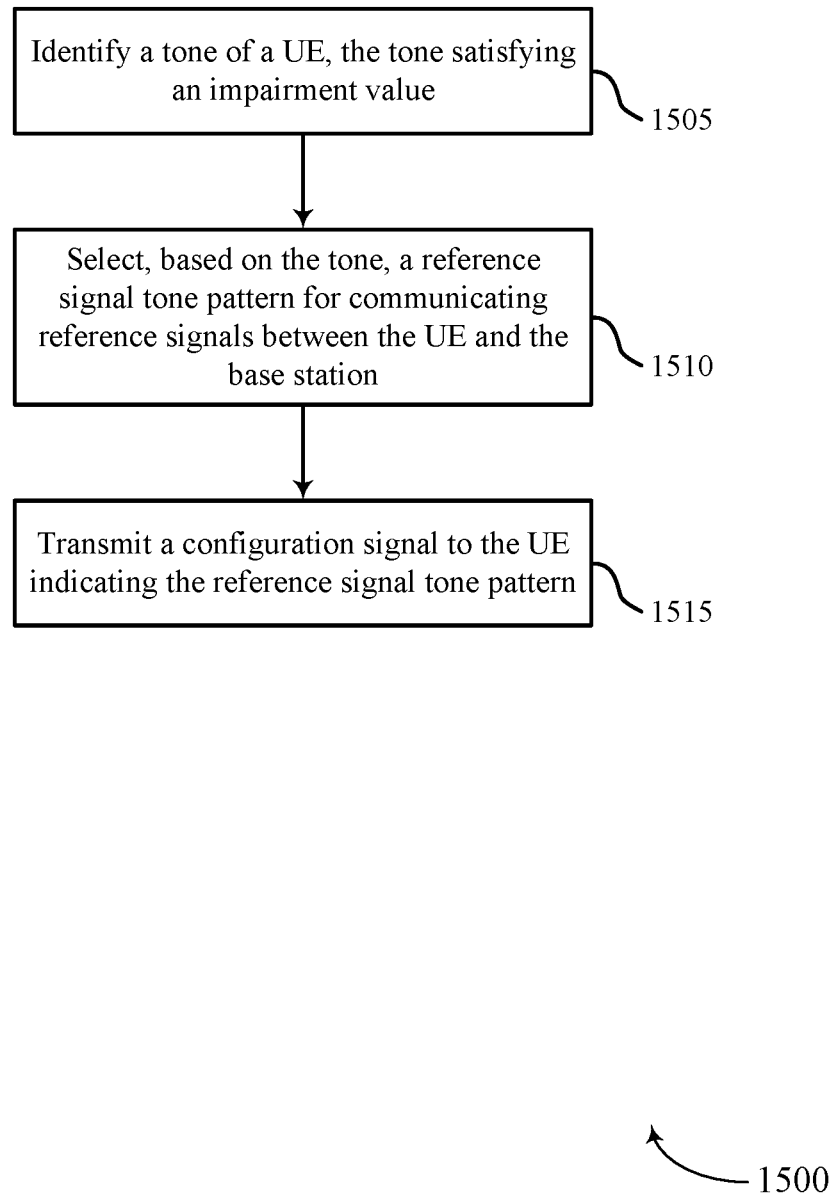

FIG. 15 shows a flowchart illustrating a method 1500 that supports reference signal tone location shift in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may identify a tone of a UE, the tone satisfying an impairment value. The operations of 1505 may be performed according to the methods described herein. In some examples, aspects of the operations of 1505 may be performed by a tone impairment manager as described with reference to FIGS. 9 through 12.

At 1510, the base station may select, based on the tone, a reference signal tone pattern for communicating reference signals between the UE and the base station. The operations of 1510 may be performed according to the methods described herein. In some examples, aspects of the operations of 1510 may be performed by a reference signal tone pattern manager as described with reference to FIGS. 9 through 12.

At 1515, the base station may transmit a configuration signal to the UE indicating the reference signal tone pattern. The operations of 1515 may be performed according to the methods described herein. In some examples, aspects of the operations of 1515 may be performed by a configuration signal manager as described with reference to FIGS. 9 through 12.

Figure 16:
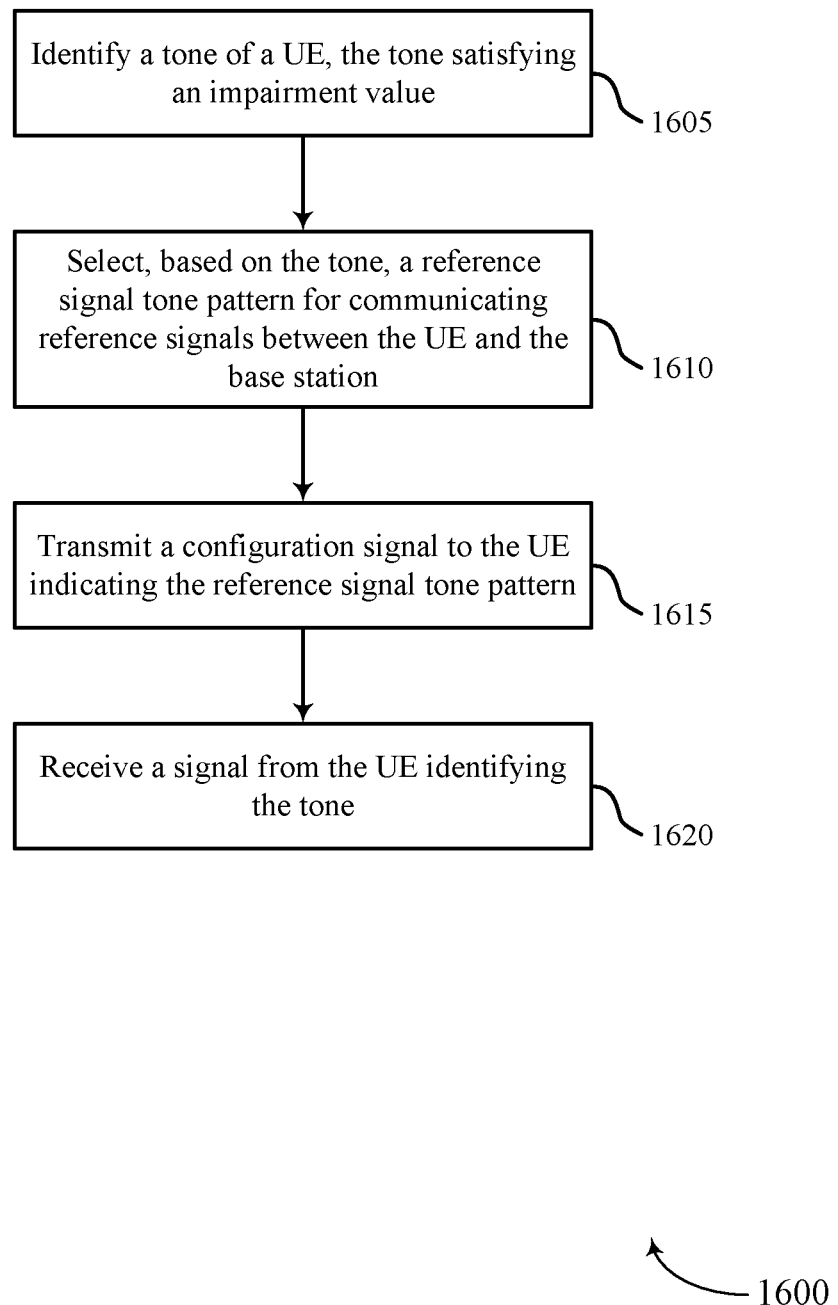

FIG. 16 shows a flowchart illustrating a method 1600 that supports reference signal tone location shift in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may identify a tone of a UE, the tone satisfying an impairment value. The operations of 1605 may be performed according to the methods described herein. In some examples, aspects of the operations of 1605 may be performed by a tone impairment manager as described with reference to FIGS. 9 through 12.

At 1610, the base station may select, based on the tone, a reference signal tone pattern for communicating reference signals between the UE and the base station. The operations of 1610 may be performed according to the methods described herein. In some examples, aspects of the operations of 1610 may be performed by a reference signal tone pattern manager as described with reference to FIGS. 9 through 12.

At 1615, the base station may transmit a configuration signal to the UE indicating the reference signal tone pattern. The operations of 1615 may be performed according to the methods described herein. In some examples, aspects of the operations of 1615 may be performed by a configuration signal manager as described with reference to FIGS. 9 through 12.

At 1620, the base station may receive a signal from the UE identifying the tone. The operations of 1620 may be performed according to the methods described herein. In some examples, aspects of the operations of 1620 may be performed by a tone impairment manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several km in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a tone satisfying an impairment value;
   selecting configuration information for communicating with a base station based at least in part on the tone;
   selectively transmitting a signal to the base station indicating the configuration information; and
   receiving a configuration signal from the base station indicating a reference signal tone pattern for communicating reference signals between the UE and the base station.

2. The method of claim 1, wherein selectively transmitting the signal indicating the configuration information comprises:
   transmitting a signal identifying the tone.

3. The method of claim 1, wherein selectively transmitting the signal indicating the configuration information comprises:
   transmitting a signal identifying the reference signal tone pattern.

4. The method of claim 1, wherein selectively transmitting the signal indicating the configuration information comprises:
   transmitting a signal identifying an offset configuration for a baseline reference signal tone pattern, wherein the reference signal tone pattern is based at least in part on the offset configuration.

5. The method of claim 4, wherein the offset configuration comprises a bit or field configured to indicate a request for an offset from the baseline reference signal tone pattern.

6. The method of claim 4, wherein the offset configuration comprises a bit or field configured to indicate a request for the base station to select the reference signal tone pattern.

7. The method of claim 4, wherein the offset configuration comprises information identifying a difference between the baseline reference signal tone pattern and the tone.

8. The method of claim 7, wherein the difference comprises a time-frequency difference.

9. The method of claim 7, wherein the difference comprises an indication to delete one or more tones from the baseline reference signal tone pattern.

10. The method of claim 4, further comprising:
    identifying the baseline reference signal tone pattern based at least in part on one or more of a previously used reference signal tone pattern, or a grant signal carried in a downlink control information (DCI) message, or a configured baseline reference signal tone pattern.

11. The method of claim 1, wherein selecting the configuration information comprises:
    selecting, based at least in part on the tone, the reference signal tone pattern from a set of available reference signal tone patterns, wherein the signal identifies the selected reference signal tone pattern.

12. The method of claim 11, wherein the signal comprises an indication of whether the base station is to select the reference signal tone pattern.

13. The method of claim 1, wherein selecting the configuration information comprises:
    identifying a UE tone for communications between the UE and the base station, wherein the UE tone corresponds to the tone.

14. The method of claim 1, wherein selectively transmitting the signal to the base station comprises:
    determining that the tone satisfies an interference level threshold with respect to communications between the UE and the base station, wherein the signal is transmitted to the base station based at least in part on the determining.

15. The method of claim 1, wherein selectively transmitting the signal to the base station comprises:
    determining that the tone fails to satisfy an interference level threshold with respect to communications between the UE and the base station, wherein the signal is not transmitted to the base station based at least in part on the determining.

16. The method of claim 1, further comprising:
    communicating the reference signals with the base station according to the reference signal tone pattern.

17. The method of claim 16, further comprising:
    communicating data between the UE and the base station, wherein the data is decoded based at least in part on the reference signals.

18. The method of claim 16, wherein the communicating comprises uplink communications, downlink communications, or a combination thereof.

19. The method of claim 1, wherein the configuration signal is received in a downlink control information (DCI) message.

20. The method of claim 1, wherein the tone comprises one or more of a receive direct current (DC) tone of the UE, or a tone satisfying a signal-to-noise ratio (SNR) threshold, or a tone satisfying an interference level threshold, or a combination thereof.

21. A method for wireless communication at a base station, comprising:
    identifying a tone of a user equipment (UE), the tone satisfying an impairment value;
    selecting, based at least in part on the tone, a reference signal tone pattern for communicating reference signals between the UE and the base station; and
    transmitting a configuration signal to the UE indicating the reference signal tone pattern.

22. The method of claim 21, wherein identifying the tone comprises:
    receiving a signal from the UE identifying the tone.

23. The method of claim 21, wherein identifying the tone comprises:
    receiving a signal from the UE identifying the reference signal tone pattern, wherein the reference signal tone pattern is selected based at least in part on the signal.

24. The method of claim 21, wherein identifying the tone comprises:
    receiving a signal from the UE identifying an offset configuration for a baseline reference signal tone pattern, wherein the reference signal tone pattern is selected based at least in part on the offset configuration.

25. The method of claim 21, wherein identifying the tone comprises:
    identifying a UE tone for communications between the UE and the base station, wherein the UE tone corresponds to the tone.

26. The method of claim 21, further comprising:
    communicating the reference signals with the UE according to the reference signal tone pattern.

27. The method of claim 26, further comprising:
    communicating data between the UE and the base station, wherein the data is decoded based at least in part on the reference signals.

28. The method of claim 26, wherein the communicating comprises uplink communications, downlink communications, or a combination thereof.

29. An apparatus for wireless communication at a user equipment (UE), comprising:
a processor,
memory in electronic communication with the processor; and
instructions stored in the memory and executable by the processor to cause the apparatus to:
identify a tone satisfying an impairment value;
select configuration information for communicating with a base station based at least in part on the tone;
selectively transmit a signal to the base station indicating the configuration information; and
receive a configuration signal from the base station indicating a reference signal tone pattern for communicating reference signals between the UE and the base station.

30. An apparatus for wireless communication at a base station, comprising:
a processor,
memory in electronic communication with the processor; and
instructions stored in the memory and executable by the processor to cause the apparatus to:
identify a tone of a user equipment (UE), the tone satisfying an impairment value;
select, based at least in part on the tone, a reference signal tone pattern for communicating reference signals between the UE and the base station; and
transmit a configuration signal to the UE indicating the reference signal tone pattern.

* * * * *